(12) United States Patent  
Tominaga et al.

(10) Patent No.: US 7,060,962 B2
(45) Date of Patent: Jun. 13, 2006

(54) ACTUATOR AND OBJECT DETECTING APPARATUS THAT USES ACTUATOR USING DISTANCE DETECTION

(75) Inventors: Jun Tominaga, Kanagawa (JP); Ryouhei Shigematsu, Kanagawa (JP); Atsuo Matsumoto, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 11/078,623

(22) Filed: Mar. 14, 2005

(65) Prior Publication Data

US 2005/0157289 A1     Jul. 21, 2005

Related U.S. Application Data

(63) Continuation of application No. PCT/JP04/01791, filed on Feb. 18, 2004.

(30) Foreign Application Priority Data

Feb. 18, 2003   (JP)   ............................. 2003-040061

(51) Int. Cl.
*G06M 7/00*   (2006.01)
*H01J 40/14*  (2006.01)

(52) U.S. Cl. ...................................................... 250/221
(58) Field of Classification Search ................ 250/221, 250/222.1

See application file for complete search history.

(56) References Cited

U.S. PATENT DOCUMENTS 6,199,427 B1 *   3/2001   Kroll et al. ..................... 73/161
6,493,170 B1 *  12/2002   Kato et al. ...................... 360/75

FOREIGN PATENT DOCUMENTS

JP             10-123252        5/1998

* cited by examiner

*Primary Examiner*—Thanh X. Luu
(74) *Attorney, Agent, or Firm*—Armstrong, Kratz, Quintos, Hanson & Brooks, LLP

(57) ABSTRACT

An actuator includes a blade spring of which one end is fixed to a fixed member and other end is fixed to a movable member. A driving unit moves the movable member. A position detector detects a distance to a flat portion of the blade spring, and a calculating unit calculates an amount of displacement of the movable member based on the distance detected by the position detector.

7 Claims, 15 Drawing Sheets

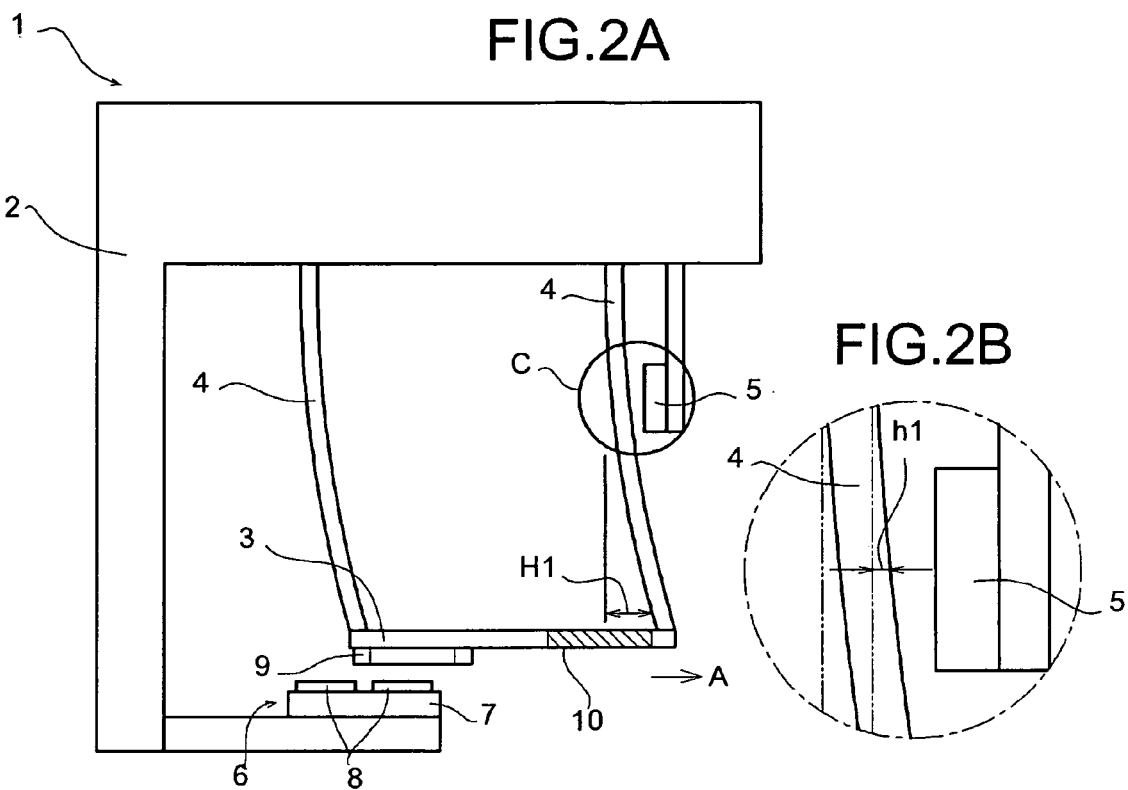
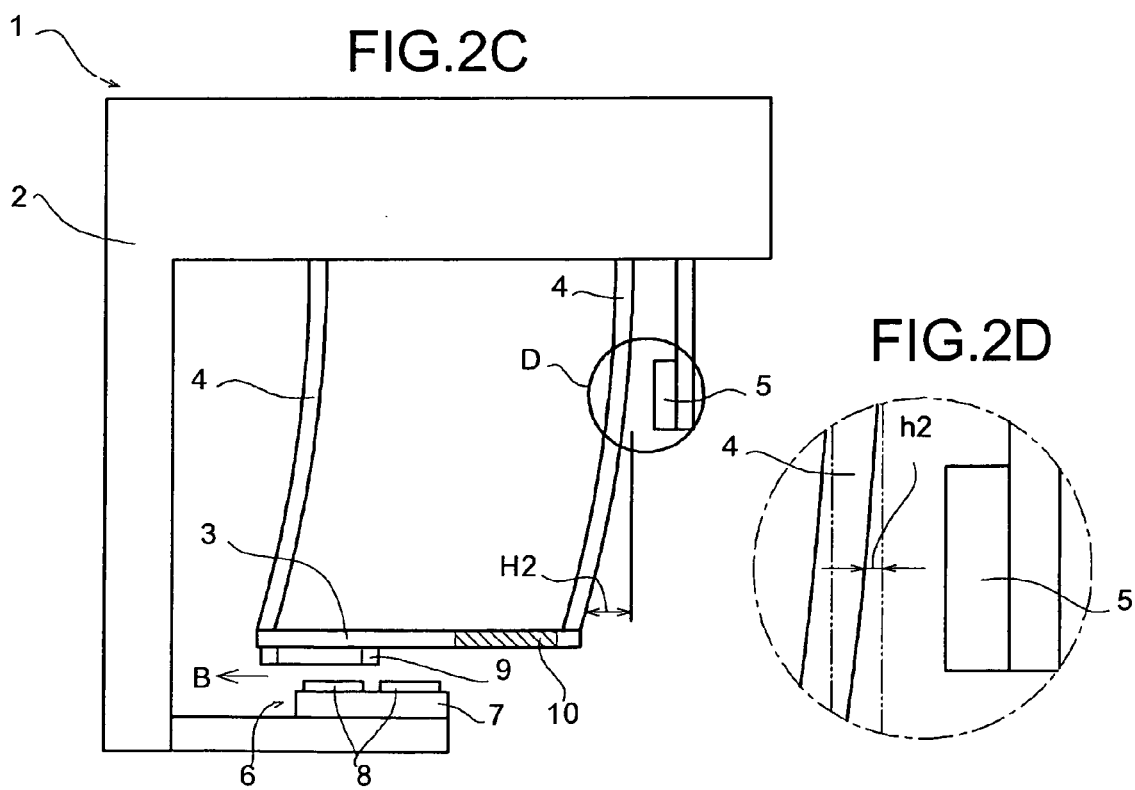

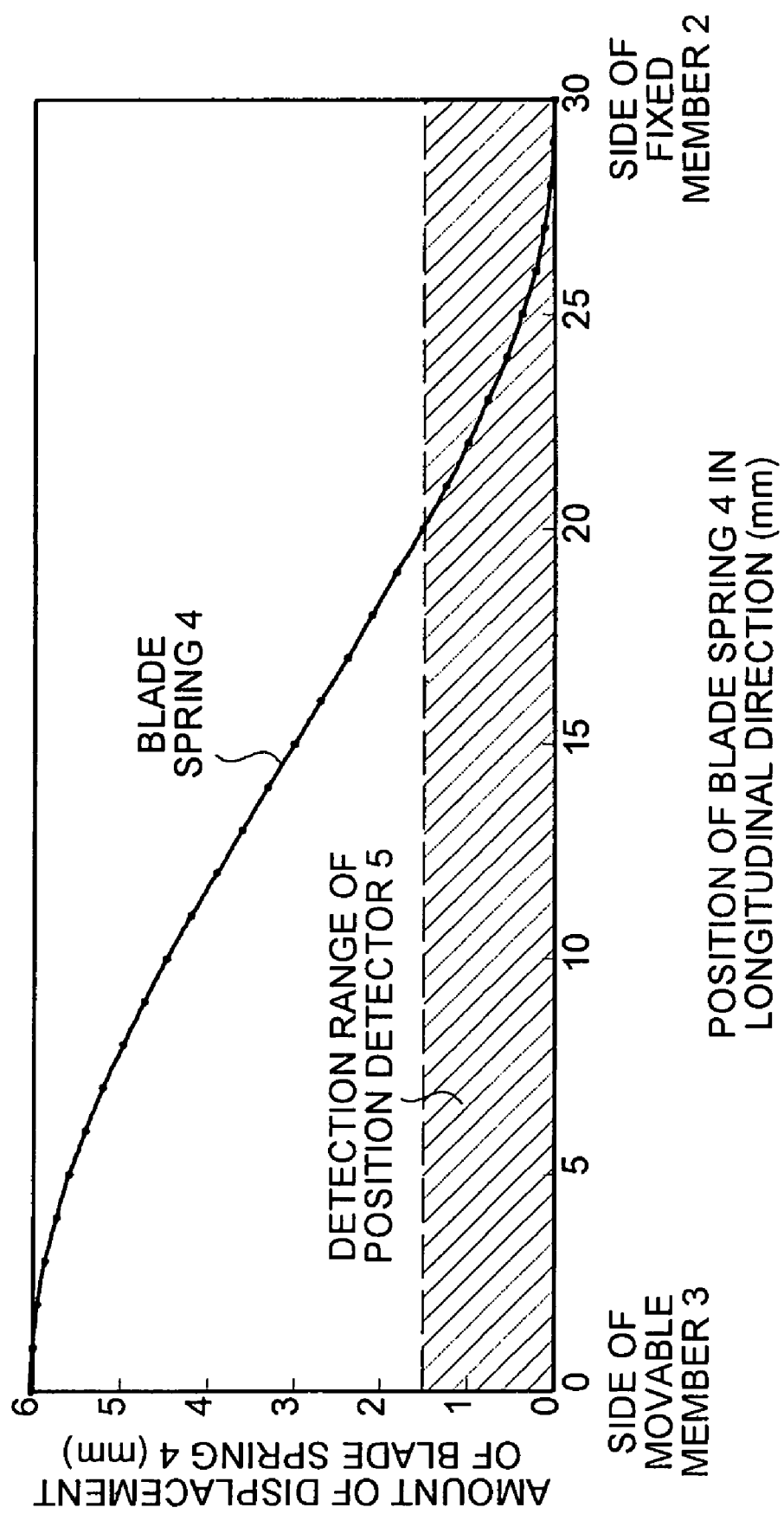

| OUTPUT VALUE | 907 | 797 | 629 | 483 | 388 | 311 | 252 | 208 | 176 |
|---|---|---|---|---|---|---|---|---|---|
| AMOUNT OF DISPLACEMENT (mm) | -6 | -4.5 | -3 | -1.5 | 0 | 1.5 | 3 | 4.5 | 6 |

FIG.8A
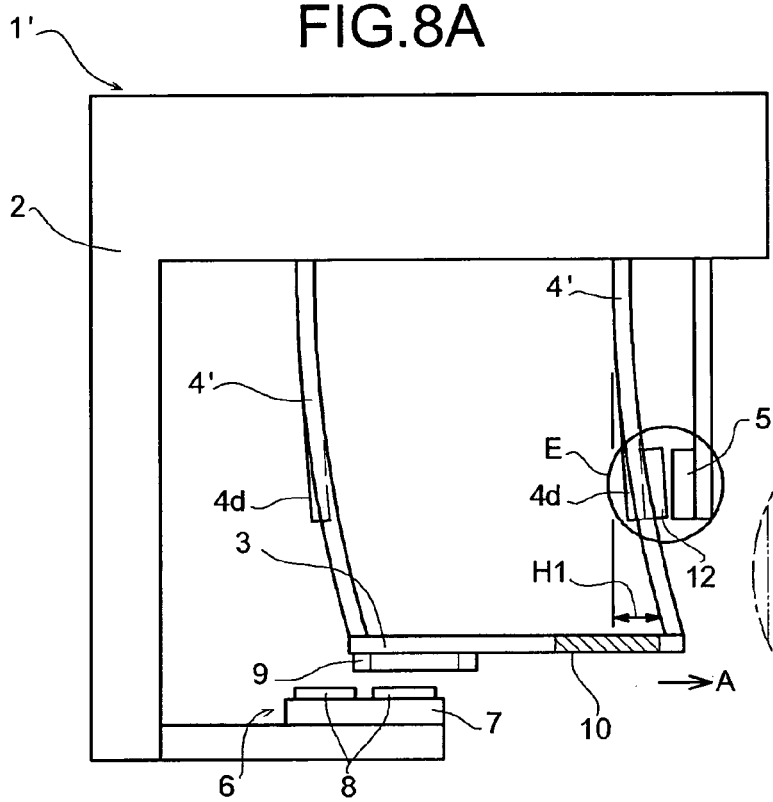
FIG.8B
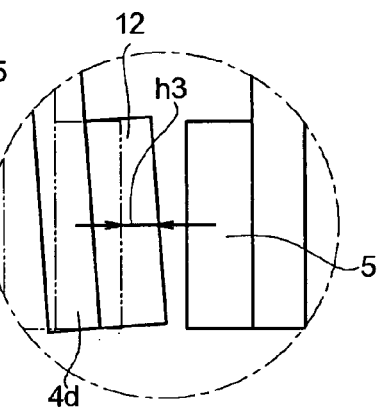
FIG.8C
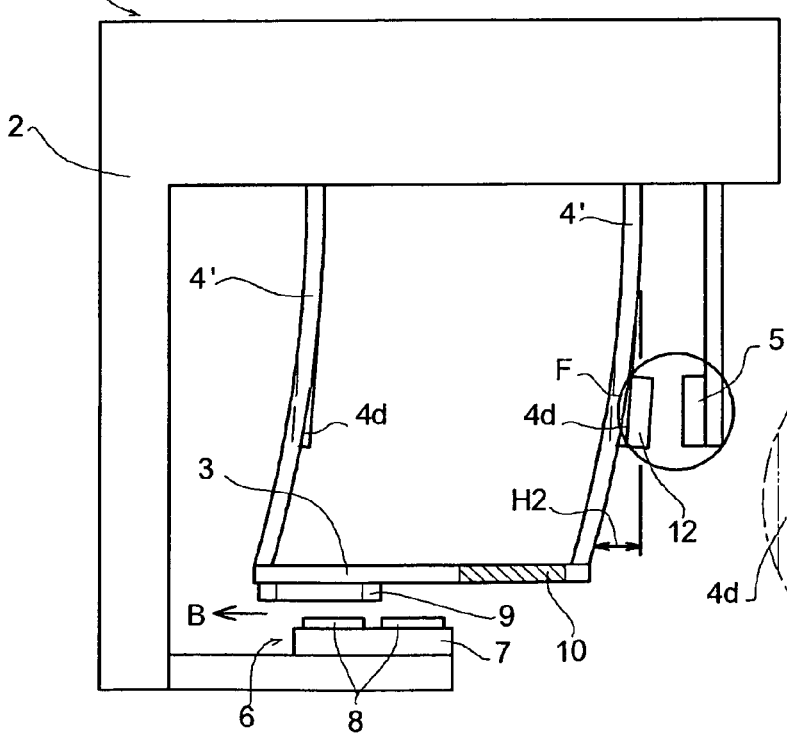
FIG.8D

ACTUATOR AND OBJECT DETECTING APPARATUS THAT USES ACTUATOR USING DISTANCE DETECTION

This application is a continuation of international application PCT/JP04/01791 filed Feb. 18, 2004.

BACKGROUND OF THE INVENTION

1) Field of the Invention

The present invention relates to an actuator that uses a blade spring, and an object detecting apparatus with the actuator.

2) Description of the Related Art

Recently, an object detecting apparatus is mounted on mobile bodies such as automobiles or motorcycles. This object detecting apparatus detects presence/absence of an object (for example, a car, a human being, a guard rail etc.) around the mobile body and/or a distance to the object.

The object detecting apparatuses generally employ laser radar and/or a millimeter wave radar to detect objects. The laser radar irradiates laser light from a phototransmitting element, this laser light is reflected from the object, and the presence/absence of the object and the distance up to the object is detected from a time required for receiving of the laser light (reflected light) from the object by a photoreceiving element that is provided in the object detecting apparatus. On the other hand, the millimeter wave radar transmits electric waves (millimeter waves) from an antenna that is provided in the object detecting apparatus, these electric waves are reflected at the object that outside the mobile body, then the reflected electric waves (reflected waves) are received by the antenna or another antenna that is provided for reception, and the presence or the absence of the object and the distance up to the object is detected from a phase difference when the reflected waves are received by the antenna.

In the object detecting apparatus, an actuator that changes a direction of irradiation of the laser light or the electric waves by moving a lens in the laser radar and the antenna in the millimeter wave radar to search over a wide range outside the mobile body is used (for example, refer to Japanese Patent Application Laid Open Publication No. H10-123252). This actuator includes a spring (a coil spring 14 according to Japanese Patent Application Laid-open Publication No. H10-123252) that is provided between a movable member on which the optical element such as the lens is fixed (a lens holder 15 according to Japanese Patent Application Laid-open Publication No. H10-123252), and a fixed member (a base member 13 according to Japanese Patent. Application Laid-open Publication No. H10-123252). Moreover, this movable member can be moved either in upward and downward or to left and right by a driving unit (a coil unit 17 that is fixed to the base member 13 through a permanent magnet 18 that is fixed to the lens holder 15 and a side frame 16 according to Japanese Patent Application Laid-open Publication No. H10-123252). By allowing the laser light that is irradiated from the fixed member or the phototransmitting element that is provided on the mobile body on which this fixed member is mounted (a laser light source 8 according to Japanese Patent Application Laid-open Publication No. H10-123252) to be incident on the lens of the movable member that is moved by the driving unit, the direction of irradiation of the laser light can be changed.

Incidentally, in recent years, with an improvement in safety consciousness and increased needs for prevention of collision and safety during collision etc., it has become necessary to widen a range of detection of the object detecting apparatus, as well as to have detailed information of outside of the mobile body. In other words, it has become necessary to increase an amount of movement of the movable member on which the lens or the antenna is installed and moreover to secure an accuracy of positioning of the movable member that has a large amount of movement. Therefore, to detect a position of the movable member with respect to the fixed member and an amount of displacement of the movable member, detecting the position of the movable member and the amount of displacement of the movable member by using a photosensor or a magnetic sensor can be taken into consideration. However, in a general low cost photosensor or magnetic sensor, a range of detection of an optical strength or magnetic strength being narrow, everything such as a position of a movable member with a large amount of movement and an amount of displacement of the movable member cannot be detected. Therefore, conventionally, a general low cost sensor with a narrow range of detection could not be used and it has been necessary to use a sensor with a wide range of detection as a position detector, thereby causing a problem of raising the cost of the object detecting apparatus comparatively.

SUMMARY OF THE INVENTION

It is an object of the present invention to solve at least the problems in the conventional technology.

An actuator according to an aspect of the present invention includes a blade spring of which one end is supported by a fixed member and other end is supported by a movable member; a driving unit that moves the movable member; a position detector that detects a distance to a predetermined position of a flat surface portion of the blade spring; and a calculating unit that calculates an amount of displacement of the movable member based on the distance detected by the position detector.

An actuator according to another aspect of the present invention includes a spring of which one end is supported by a fixed member and other end is supported by a movable member; a driving unit that moves the movable member; a displaceable member attached to the movable member and that is displaced in direction that is substantially orthogonal to a direction of movement of the movable member; a position detector that detects a distance to the displaceable member; and a calculating unit that calculates an amount of displacement of the movable member based on the distance detected by the position detector.

An object detecting apparatus according to still another aspect of the present invention is mounted on a first object and includes a laser oscillator that produces laser beams; an actuator that deflects the laser beams; a photoreceiving unit that receives laser beams that after being deflected by the actuator fall on a second object, which moves relatively to the first object, and are reflected from the second object; and a detecting/calculating unit that any one of detects a presence of the second object and calculates a distance between the first object and the second object based on laser beams received in the photoreceiving unit. The actuator includes a blade spring of which one end is supported by a fixed member and other end is supported by a movable member; a driving unit that moves the movable member; an optical element that is attached to the movable member and that receives the laser beams from the laser oscillator and deflects the laser beams to at least two directions that are orthogonal to each other; a position detector that detects a distance to a predetermined position of a flat surface portion of the blade spring; and a calculating unit that calculates an amount of displacement of the movable member based on the distance detected by the position detector.

An object detecting apparatus according to still another aspect of the present invention is mounted on a first object and includes a laser oscillator that produces laser beams; an actuator that deflects the laser beams; a photoreceiving unit that receives laser beams that after being deflected by the actuator fall on a second object, which moves relatively to the first object, and are reflected from the second object; and a detecting/calculating unit that any one of detects a presence of the second object and calculates a distance between the first object and the second object based on laser beams received in the photoreceiving unit. The actuator includes a spring of which one end is supported by a fixed member and other end is supported by a movable member; a driving unit that moves the movable member; an optical element that is attached to the movable member and that receives the laser beams from the laser oscillator and deflects the laser beams to at least two directions that are orthogonal to each other; a displaceable member attached to the movable member and that is displaced in direction that is substantially orthogonal to a direction of movement of the movable member; a position detector that detects a distance to the displaceable member; and a calculating unit that calculates an amount of displacement of the movable member based on the distance detected by the position detector.

An object detecting apparatus according to still another aspect of the present invention is mounted on a first object and includes a wave producer that produces waves; an actuator that deflects the waves; a receiver that receives waves that after being deflected by the actuator fall on a second object, which moves relatively to the first object, and are reflected from the second object; and a detecting/calculating unit that any one of detects presence of the second object and calculates a distance between the first object and the second object based on waves received in the receiver. The actuator includes a blade spring of which one end is supported by a fixed member and other end is supported by a movable member; a driving unit that moves the movable member; an antenna that is attached to the movable member and that produces the waves; a position detector that detects a distance to a predetermined position of a flat surface portion of the blade spring; and a calculating unit that calculates an amount of displacement of the movable member based on the distance detected by the position detector.

An object detecting apparatus according to still another aspect of the present invention is mounted on a first object and includes a wave producer that produces waves; an actuator that deflects the waves; a receiver that receives waves that after being deflected by the actuator fall on a second object, which moves relatively to the first object, and are reflected from the second object; and a detecting/calculating unit that any one of detects presence of the second object and calculates a distance between the first object and the second object based on waves received in the receiver. The actuator includes a spring of which one end is supported by a fixed member and other end is supported by a movable member; a driving unit that moves the movable member; an antenna that is attached to the movable member and that produces the waves; a displaceable member attached to the movable member and that is displaced in direction that is substantially orthogonal to a direction of movement of the movable member; a position detector that detects a distance to the displaceable member; and a calculating unit that calculates an amount of displacement of the movable member based on the distance detected by the position detector.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2A depicts the actuator that has moved in a direction of an arrow A shown in FIG. 1B and FIG. 2B is an enlarged view of a portion C in FIG. 2A, FIG. 2C depicts the actuator that has moved in a direction of an arrow B shown in FIG. 1B, and FIG. 2D is an enlarged view of a portion D in FIG. 2C;

FIG. 4 is a diagram for explaining a relationship between a position of a blade spring in a longitudinal direction and an amount of displacement of the blade spring in that position;

FIG. 8A depicts the actuator that has moved in a direction of an arrow A shown in FIG. 5B, FIG. 8B is an enlarged view of a portion E in FIG. 8A, FIG. 8C depicts the actuator that has moved in a direction of an arrow B shown in FIG. 5B, FIG. 8D is an enlarged view of a portion F in FIG. 8C;

DETAILED DESCRIPTION

The following is a detailed description of the present invention with reference to diagrams. The present invention is not restricted to these embodiments. Modifications and alternative constructions, which can be assumed easily by a person having an ordinary skill in the art and those, which are substantially identical, are included in components of the following embodiments.

Figure 1A:
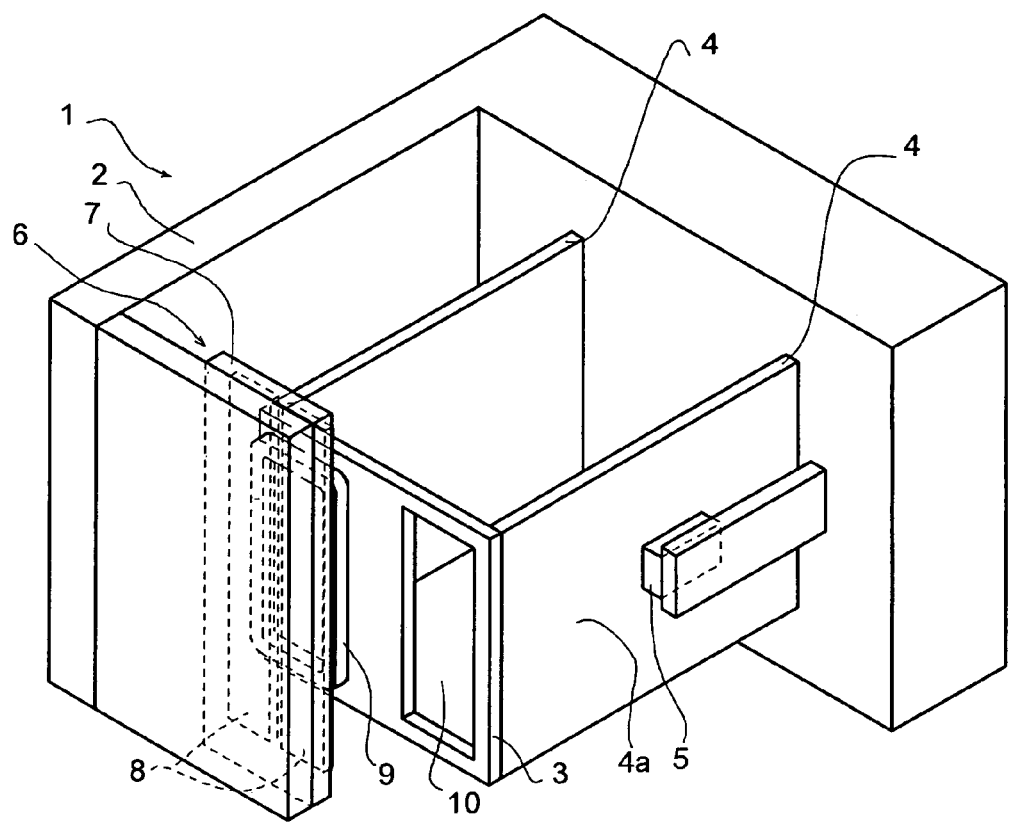
FIG. 1A is a perspective view and FIG. 1B is a top view of an actuator according to a first embodiment of the present invention.
Figure 1B:
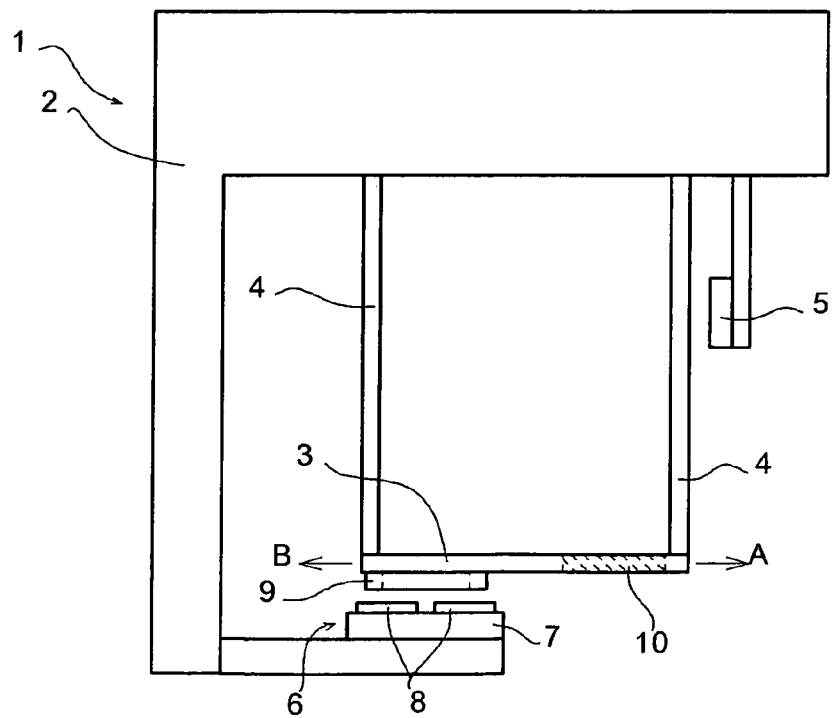

FIG. 1A is a perspective view and FIG. 1B is a top view of an actuator according to a first embodiment of the present invention. As shown in FIG. 1A, an actuator 1 includes a fixed member 2, a movable member 3, two blade springs 4, a position detector 5, and a driving unit 6. The fixed member 2, as shown in FIG. 1B, is a c-shaped member with one end of the fixed member 2 holding one end of the blade springs 4 and the other end having a yoke 7 and two magnets 8 that are included in a the driving unit 6, mounted on it. The movable member 3 is a member in the form of a blade with two ends of the movable member 3 supporting one end of each of the blade springs 4 and a coil 9 that is included in the driving unit 6, is installed at a position facing the magnet 8 that is attached to the fixed member 2. In other words, the two ends of the two blade springs 4 are supported by the fixed member 2 and the movable member 3. Further, 10 is a lens for transmitting and receiving light, in an object detecting apparatus, in which this actuator that is mentioned later is used.

The two blade springs 4 are disposed in parallel, between the fixed member 2 and the movable member 3 and as mentioned above, those two ends are supported by the fixed member 2 and the movable member 3 respectively. In other words, the blade springs 4 are supported in parallel to each other with respect to the movable member 3 and the fixed member 2. The position detector 5 is a photosensor that detects an amount of displacement of the blade spring 4 that is attached the fixed member 2 so that it faces one of the blade springs 4. The position detector 5 irradiates light on this blade spring 4, receives reflected light from the blade spring 4 and detects the amount of displacement of the blade spring. The position detector 5 is mounted on the fixed member 2 so that it faces a predetermined position of a flat surface portion 4a of the blade spring 4. The predetermined position of the flat surface portion 4a is described later.

The driving unit 6 forms a voice call motor by a permanent magnet circuit that includes the yoke 7 and the two magnets 8 attached to the fixed member 2, and the coil 9 that is attached to the movable member 3. As current passes through the coil 9, the movable member 3, as shown in FIG. 1B, moves is a direction of either an arrow A or an arrow B. Thus the driving unit 6 is a unit that imparts driving force to move. Further, the coil 9 is connected electrically to the two blade springs 4, i.e. both ends of leads that are not shown in the diagram, are connected to the blade springs 4 respectively and the structure is such that driving current of the driving unit 6 is supplied from the blade springs 4. Thus, the leads of the coil 9 are in contact with the movable member 3 that moves and the blade springs 4, thereby preventing disconnection.

Figure 3:
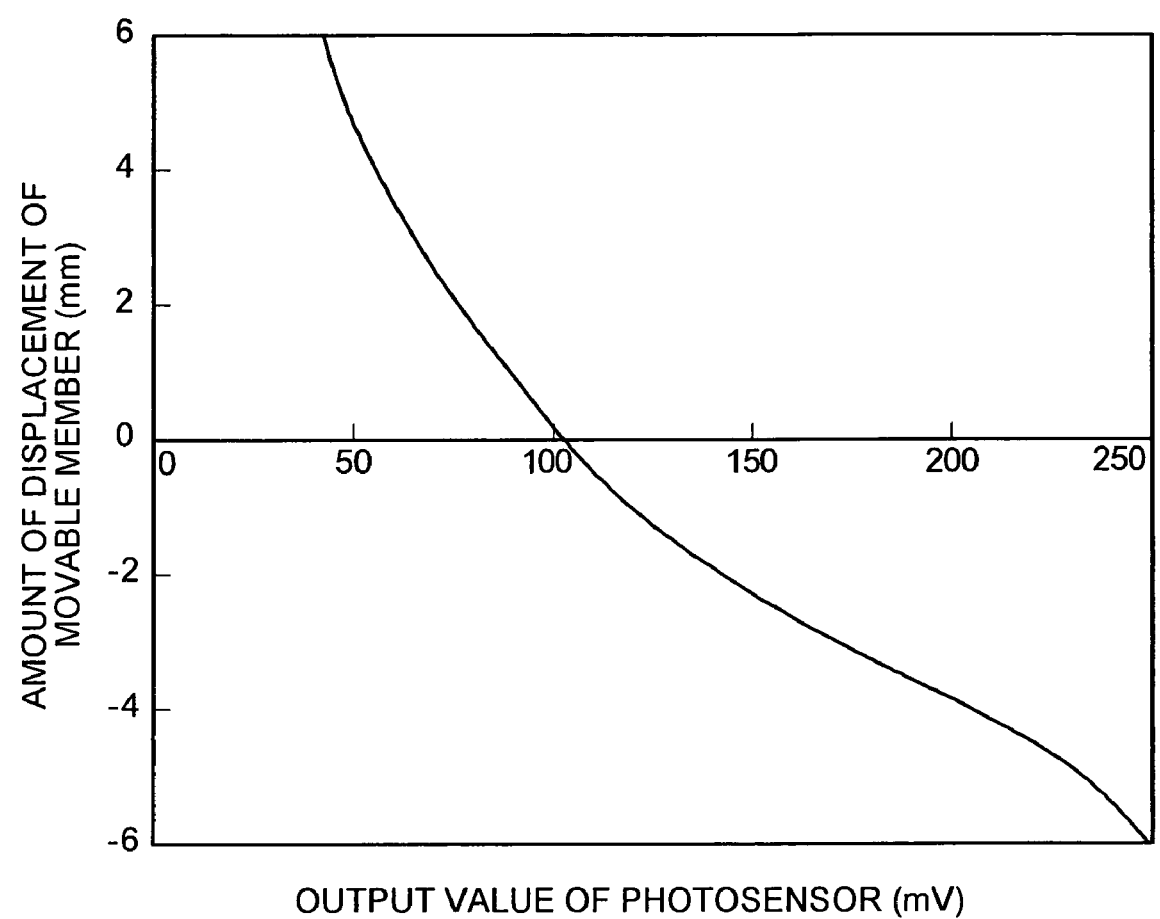
FIG. 3 is a diagram for explaining a relationship between an output value of a photosensor and an amount of displacement of a movable member of the actuator according to the first embodiment.

Next, an operation of the actuator 1 is described. FIG. 2A depicts a state in which the actuator has moved in the direction of the arrow A shown in FIG. 1B, FIG. 2B is an enlarged view of a portion C in FIG. 2A, FIG. 2C depicts a state in which the actuator has moved in the direction of the arrow B shown in FIG. 1B, and FIG. 2D is an enlarged view of a portion D in FIG. 2C. Driving force in the direction of either the arrow A or the arrow B in FIG. 1B, i.e. Lorentz's force, is generated from a calculating unit that is mentioned later, in the coil 9 of the driving unit 6 to which the driving current is supplied, through two blade springs 4. When the driving force is generated in the direction of the arrow A, as shown in FIG. 2A, the blade springs 4 are bent and the movable member 3 moves in the direction of the arrow A. Moreover, the movable member 3 moves up to a position where the driving force in the direction of the arrow A and an elastic force of the two blade springs 4 are balanced, and stops at this position. If an amount of displacement of the movable member 3 at this time is let to be H1, an amount of displacement of the blade spring in the predetermined position of the flat surface portion 4a of the blade spring 4 facing the position detector 5 that is attached to the fixed member 2 as shown in FIG. 2B is h1, which is smaller than the amount of displacement of the movable member H1. On the other hand, when the driving force is generated in the direction of the arrow B by supplying in the driving current to the coil 9 in the opposite direction, as shown in FIG. 2C, the blade spring 4 is bent and the movable member moves in the direction of the arrow B. Further, the movable member 3 moves up to a position where the driving force in the direction of the arrow B and the elastic force of the two blade springs 4 are balanced, and stops at this position. If the amount of displacement of the movable member 3 at this time is let to be H2, the amount of displacement of the blade spring 4 in the predetermined position of the flat surface portion 4a of the blade spring 4 facing the position detector 5 as shown in FIG. 2D is h2, which is smaller than the amount of displacement of the movable member H2. In other words, based on the amounts of displacement h1 and h2, which are smaller than the amounts of displacement H1 and H2 of the movable member 3, the position detector 5 detects a distance between the predetermined position of the blade spring 4 and the position detector 5. FIG. 3 is a diagram for explaining a relationship between an output value of a photosensor and the amount of displacement of the movable member of the actuator according to the first embodiment. This is a case where a photosensor that has the amount of displacement ±6 mm of the movable member 3, a range of detection (sensitivity of the sensor) ±1.5 mm, is used as the position detector 5. As shown in the diagram, it can be verified that an output value (mV) upon detection of the amount of displacement of the blade spring 4 by the position detector 5 when the blade spring 4 has displaced to the predetermined position corresponding to a range in which the movable member 3 can be displaced, i.e. corresponding to the amount of displacement ±6 mm of the movable member 3, secures linearity. In other Words, the amount of displacement of the movable member 3 with a large amount of movement can be dealt with within a range of resolution of the position detector 5 that has a narrow range of detection.

The predetermined position of the flat surface portion 4a of the blade spring 4 is a position where the linearity of a detection result of the photosensor, which is the position detector 5 that detects the amount of displacement of the blade spring 4, can be secured, in other words, the amount of displacement of the movable member can be dealt with within the range of resolution of the position detector 5. It is described below in detail. FIG. 4 is a diagram for explaining a relationship between a position of the blade spring in a longitudinal direction and the amount of displacement of the blade spring in that position. The movable member 3 is made to move ±6.0 mm and a length of the blade spring 4 in the longitudinal direction is 30 mm. When the range of detection of the photosensor (sensitivity of the sensor), which is the position detector 5, is ±1.5 mm, by letting a position of the blade spring 4 in a vicinity of 20 mm from a side of the movable member 3 to be the predetermined position, the detection result of the position detector 5 can secure the linearity to the maximum extent as shown in FIG. 3. Here, since the predetermined position of the flat surface portion 4a of the blade spring 4 may be a position where the amount of displacement of the movable member 3 can be calculated from the distance between the blade spring 4 detected by the position detector 5, and the position detector 5, by a calculating unit 11 that is mentioned later, in other words a position where some linearity can be secured, the predetermined position is not restricted to a position in the vicinity of 20 mm from the side of the movable member 3. For example, a range of 16 mm to 24 mm from the side of the movable member 3 may be let to be the predetermined position.

Figures 5A, 5B:
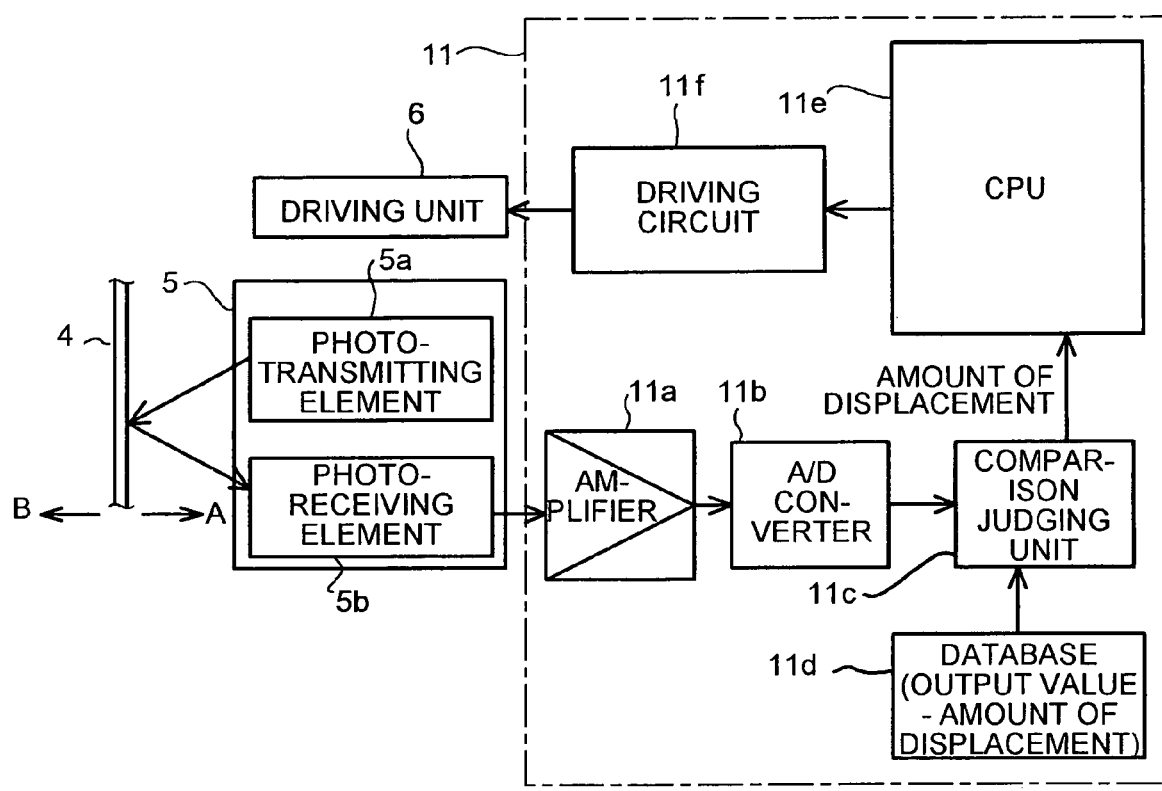
FIG. 5A is an example of the configuration of the control block of the actuator and FIG. 5B is an example of a structure of a database.

Next, a calculating unit of the actuator 1 is described. FIG. 5A is an example of the configuration of the control block of the actuator, and FIG. 5B is an example of a structure of a database. As shown in FIG. 5A, in the calculating unit 11, light that is transmitted from a phototransmitting element 5a of the position detector 5 is reflected from the blade spring 4 that faces the position detector 5, and light reflected from the blade spring 4 is received by a photoreceiving element 5b of the position detector 5. The photoreceiving element 5b outputs current that has a voltage value according to an intensity of the reflected light as a photosensor output value (refer to FIG. 3). Further, a surface of the predetermined position of the flat surface portion 4a of the blade spring 4 that is subjected to detection by the position detector 5 may be printed, covered with a seal, plated, or processed (such as embossing finished) so as to avoid damage due to bending of the blade spring 4 as well as not to let reflectivity of light from position detector 5 to change over a long period of time. By doing so, the reflectivity at the predetermined position on the flat surface portion 4a of the blade spring 4 is not changed over a long period of time and the photoreceiving element 5b of the position detector 5 can receive light stably over a long period of time, thereby enabling to secure an accuracy of positioning of the movable member 3 over a long period of time.

The photosensor output value is amplified by an amplifier 11a, converted to a digital output value by an A/D converter 11b, and the amount of displacement of the blade spring 4 that is converted to the digital output value is input to a comparison judging unit 11c. The comparison judging unit 11c calculates an actual amount of displacement of the movable member 3 by comparing the digital output value that is input by the A/D converter 11b and a digital output value in a table shown in FIG. 5B that is stored in a database 11d. Moreover, a table of the amount of displacement (±6 mm) of the movable member 3 corresponding to the digital output value that is stored in the database 11d is prepared by converting to the digital output value a photosensor output value of the amount of displacement of the blade spring 4 corresponding to the amount of displacement of the movable member 3 when the movable member 3 of the actuator shown in FIG. 1 is allowed to move in advance in the direction of the arrow A and in the direction of the arrow B. The table of the database 11d may also be prepared from the relationship between the output value of the photosensor and the amount of displacement of the movable member shown in FIG. 3.

A CPU 11e outputs the amount of displacement of the movable member as a driving signal to the driving circuit 11f to move the movable member 3, and the driving circuit 11f supplies driving current to the driving unit 6. In other words, the driving circuit 11f supplies the driving current to the coil 9 of the driving unit 6 and moves the movable member in the direction of either the arrow A or the arrow B shown in FIG. 1. Here, upon comparison, if the amount of displacement of the movable member 3 that has moved by the driving signal from the CPU 11e differs from the actual amount of displacement of the movable member 3 that is calculated, the CPU 11e further outputs a driving signal for correcting the amount of displacement of the movable member based on the actual amount of displacement of the movable member 3 that is calculated, and the amount of displacement of the movable member 3 is corrected.

Thus, in this actuator 1, the positioning detector 5 lets the predetermined position of the flat surface portion 4a of the blade spring 4 to be a position subjected to detection or more favorably lets the position where the linearity of the detection result of the position detector 5 that detects the amount of displacement of the blade spring 4 that is displaced with the movement of the movable member 3 to be the position subjected to detection. The predetermined position of the flat surface portion 4a of the blade spring 4 is bent with the movement of the movable member 3 and since the amounts of displacement h1 and h2 of the blade spring 4 displaced due to the bending is displaced in a range smaller than that of the amounts of displacement H1 and H2 of the movable member 3, the position detector 5 that is low cost and with a narrow range of detection (for example, a low cost photosensor) can be used. Therefore, even if the amount of movement of the movable member 3 is large, the position detector 5 can detect the distance between the predetermined position of the flat surface portion 4a of the blade spring 4, and the position detector 5 and can calculate the amount of displacement of the movable member 3 from this distance. Moreover, since the CPU 11e further corrects the amount of displacement of the movable member 3 based on the actual amount of displacement of the movable member 3 that is calculated by the calculating unit 11, the actuator 1 can correct the displacement of the movable member 3 caused due to temperature characteristics of the blade spring 4 and deflection of the movable member 3 due to an external influence.

Figure 6A:
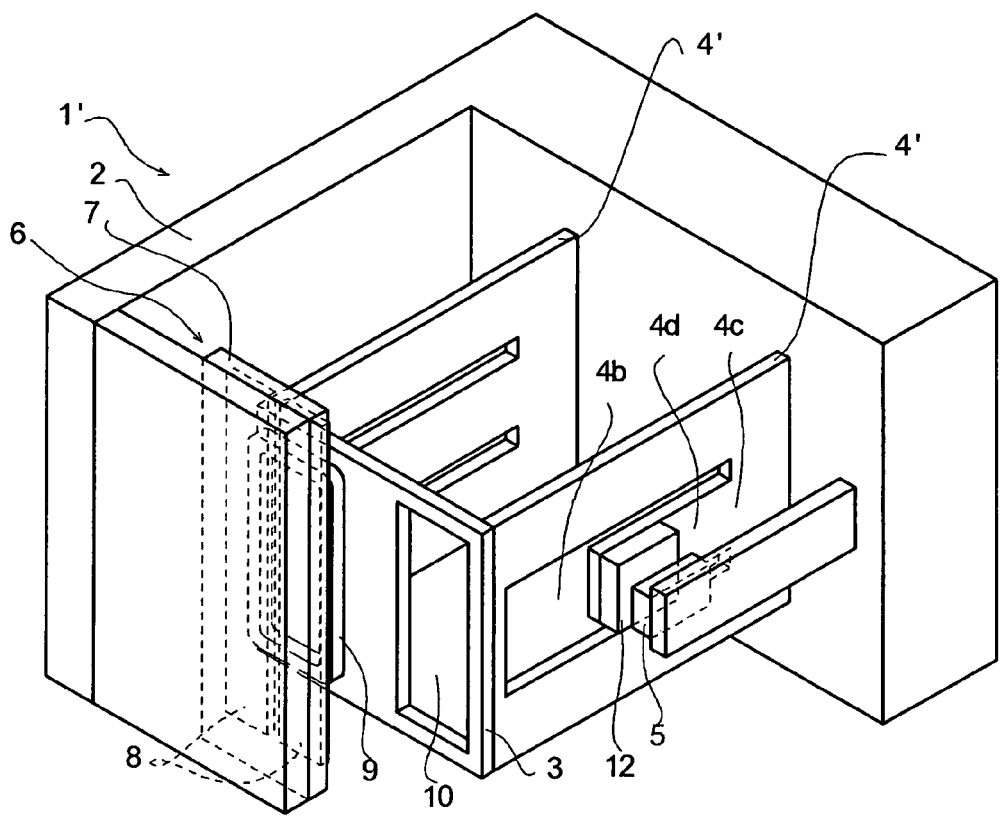
FIG. 6A is a perspective view and FIG. 6B is a top view of an actuator according to a second embodiment of the present invention.
Figure 6B:
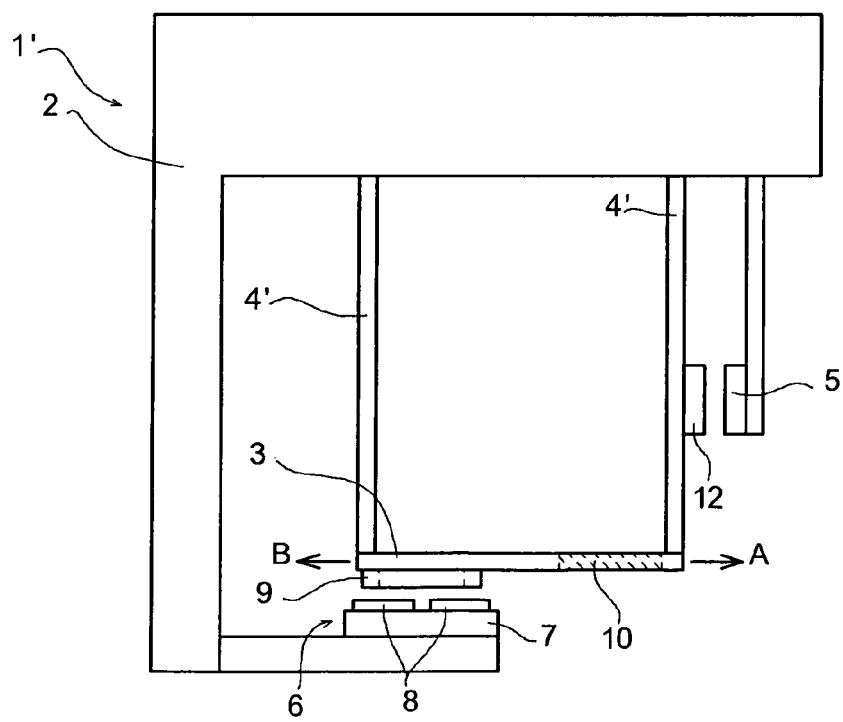

FIG. 6A is a perspective view and FIG. 6B is a top view of an actuator according to a second embodiment of the present invention. An actuator 1' shown in these diagrams differs from the actuator 1 shown in FIG. 1 at a point that a blade spring 4' that faces the position detector 5 is provided with a hollow portion 4b, a protruding portion 4d, and a reflector 12. Moreover, the basic structure of the actuator 1' according to the second embodiment being almost similar to the actuator 1 according to the first embodiment, that description is omitted.

As shown in FIG. 6A, the hollow portion 4b is provided in the blade spring 4' of which the two ends are supported by the fixed member 2 and the movable member 3. The protruding portion 4d that protrudes from a side of the fixed member 2 towards the movable member 3 is provided on an end portion 4c on one side of the hollow portion 4b. On a front end of this protruding portion 4d, the reflector 12 is provided such that it faces the position detector 5. The reflector 12 is made of a material for which there is no change in the reflectivity of light from the surface due to deterioration with aging as in the blade spring, such as resin that has less unevenness of reflection due to deterioration with aging. Further, instead of using the resin material, the protruding portion 4d may by printed, covered with a seal, plated, or processed (such as embossing finished). By doing so, the reflectivity at a surface of the protruding portion 4d is not changed over a long period of time and the position detector 5 can receive light stably over a long period of time, thereby enabling the detection result of the position detector to secure linearity over a long period of time. By using the resin material for the reflector 12, it can be integrated with other portions (such as the fixed member 2 and the movable member 3) of the actuator 1'.

Figure 7:
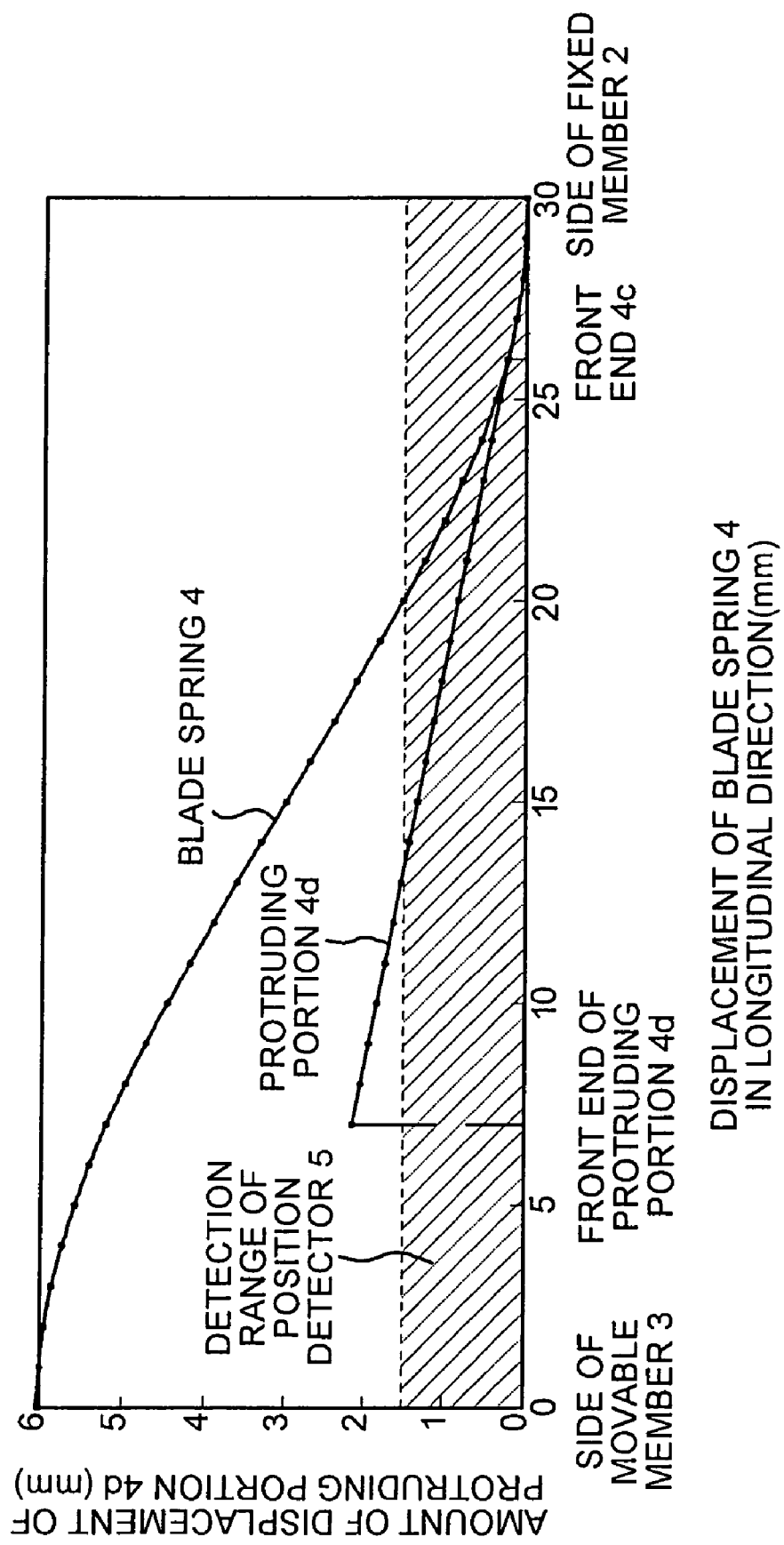
FIG. 7 is a diagram for explaining a relationship between the position in the longitudinal direction of the blade spring and an amount of displacement of a protruding portion in that position.

The end portion 4c on the side of the fixed member of the hollow portion 4b is provided within the range of detection of the position detector 5 (range of sensitivity of the sensor in the photosensor) with respect to the blade spring 4' and in a position where a distance between the reflector 12 provided on the protruding portion 4d and the position detector 5 can be detected. FIG. 7 is a diagram for explaining a relationship between the position in the longitudinal direction of the blade spring and an amount of displacement of the protruding portion in that position. The movable member 3 moves for ±6.0 mm, a length in the longitudinal direction of the blade spring 4 is 30 mm, the end portion 4c of the hollow portion 4b is let to be at a position 26 mm away from the side of the movable member 3, and length of the protruding portion 4d is let to be 19 mm. As shown in FIG. 7, the reflector 12 provided on the protruding portion 4d is displaced without being bent much comparatively, in synchronization with displacement of the end portion 4c of the hollow portion 4b while being supported by the end portion 4c of the hollow portion 4b that is displaced with the movement of the movable member 3. When the range of detection (sensitivity of the sensor) of the photosensor that is the position detector 5, is ±1.5 mm, the reflector 12 is to be provided in the vicinity of 13 mm from the end portion 4c, i.e. in the vicinity of 13 mm from the side of the movable member 3. An amount of displacement of the protruding portion 4d changes according to the position of the end portion with respect to the blade spring 4 and the length of the protruding portion 4d. Therefore, by changing the position of the end portion 4c and the length of the protruding portion 4d, the reflector 12 can be provided in a voluntary position of the protruding portion 4d that enables the detection result of the position detector 5 to secure maximum linearity, thereby enabling to improve the degree of freedom of designing. Further, it is favorable that both the blade springs 4' have similar shape. This is for stabilizing the movement of the movable member 3 when the movable member 3 is supported in parallel by the blade springs 4'.

Next, an operation of the actuator 1' is described. FIG. 8A is a diagram for explaining a state of the actuator that has moved in the direction of the arrow A shown in FIG. 6B, FIG. 8B is an enlarged view of a portion E in FIG. 8A, FIG. 8C is a diagram for explaining a state of the actuator that has moved in the direction of the arrow B shown in FIG. 6B, and FIG. 8D is an enlarged view of a portion F in FIG. 8C. When the driving current is supplied from the calculating unit 11 that is mentioned later, to the driving unit 6 through the blade springs 4', the driving force in the direction of the arrow A is generated as shown in FIG. 8A. When the driving force is generated in the direction of the arrow A, the blade springs 4' are bent and the movable member 3 moves in the direction of the arrow A up to a position where the driving force and the elastic force of the blade springs 4' are balanced, and stops at this position. At this time, an amount of displacement of the reflector 12 that is provided on the protruding portion 4d is in synchronization with the displacement of the end portion 4c of the hollow portion 4b, and becomes h3, which is smaller than the amount of displacement H1 of the movable member 3, as shown in FIG. 8B. On the other hand, by supplying the driving current in a reverse direction to the driving unit 6, when the driving force is generated in the direction of the arrow B as shown in FIG. 8C, the blade springs 4' are bent, the movable member 3 moves in the direction of the arrow B up to the position where the driving force and the elastic force of the blade springs 4' are balanced, and stops at this position. At this time, the amount of displacement of the reflector 12 that is provided on the protruding portion 4d is in synchronization with the displacement of the end portion 4c of the hollow portion 4b, and becomes h4, which is smaller than the amount of displacement H2 of the movable member 3, as shown in FIG. 8D. In other words, the position detector 5 detects the distance between the reflector 12 that is provided on the protruding portion 4d of the blade spring 4 and the position detector 5 based on the amounts of displacement h3 and h4 of the reflector, which are smaller than the amounts of displacement H1 and H2 of the movable member 3.

Figure 9:
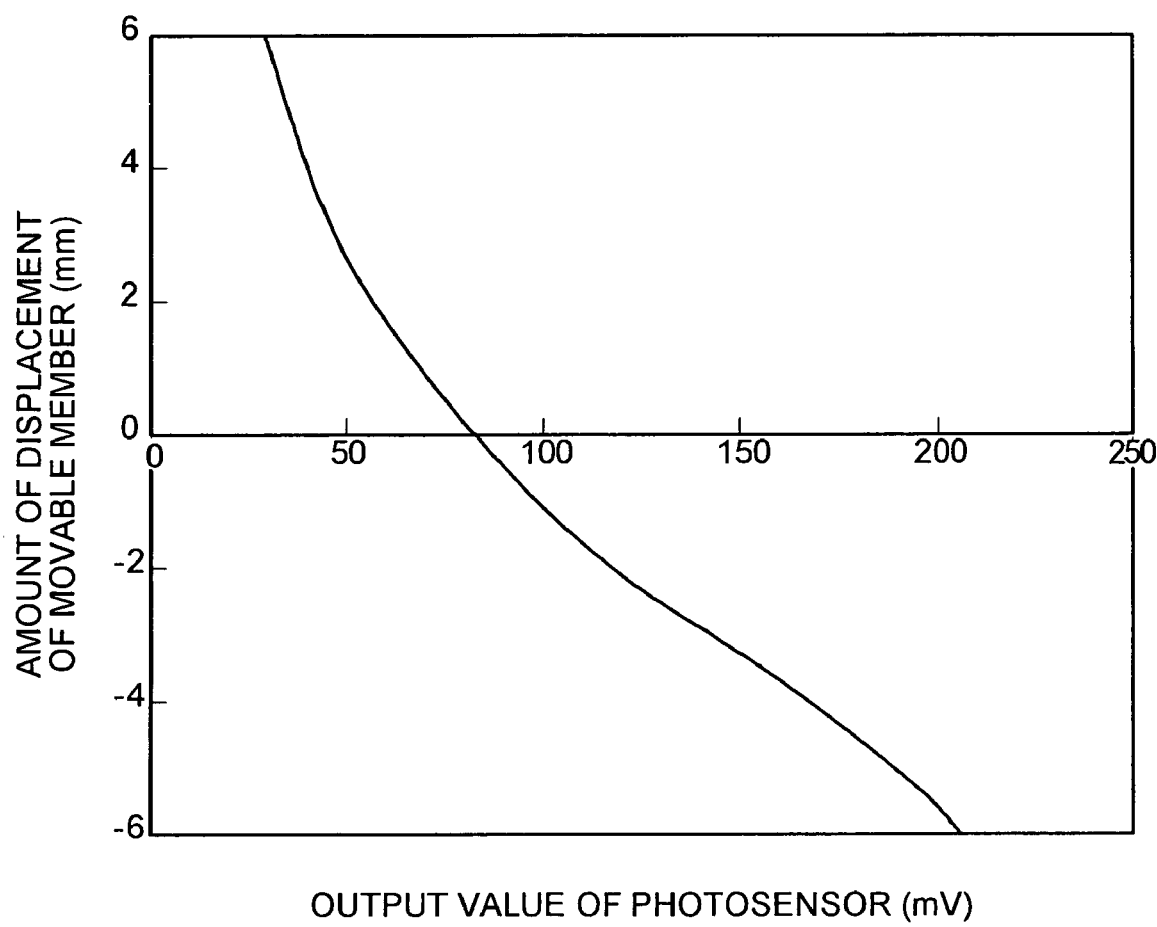
FIG. 9 is a diagram for explaining a relationship between an output value of the photosensor and an amount of displacement of the movable member of the actuator according to the second embodiment.

FIG. 9 is a diagram for explaining a relationship between the output value of the photosensor and the amount of displacement of the movable member of the actuator according to the second embodiment. This is a case where a photosensor that has the amount of displacement ±6 mm of the movable member 3 and the range of detection (sensitivity of the sensor) ±1.5 mm, is used as the position detector 5. As shown in FIG. 9, it can be verified that the output value (mV) upon detection of the amount of displacement of the reflector 12 by the position detector 5 corresponding to the amount of displacement ±6 mm of the movable member 3, secures linearity. In other words, the amount of displacement of the movable member 3 with a large amount of movement can be dealt with within the range of resolution of the position detector 5 that has a narrow range of detection.

The calculating unit of the actuator 1' according to the second embodiment has an identical configuration as that of the calculating unit 11 of the actuator 1 according to the first embodiment shown in FIG. 5. To start with, the light that is transmitted from the phototransmitting element 5a of the position detector 5 is reflected from the reflector 12 that faces the position detector 5, and light reflected from the reflector 12 is received by the photoreceiving element 5b. The photoreceiving element 5b outputs current that has a voltage value according to the intensity of the light reflected, as the output value of the photosensor (refer to FIG. 9), and this output value of the photosensor is input to the comparison judging unit 11c through the amplifier 11a and the A/D converter 11b. The comparison judging unit 11c compares the digital output value that is input and the digital output value in the table of the database 11d shown in FIG. 5B, and outputs the actual amount of displacement of the movable member 3 to the CPU 11e. The CPU 11e outputs the amount of displacement of the movable member 3 as a driving signal to the driving circuit 11f to move the movable member 3, the driving circuit 11f supplies the driving current to the driving unit 6, and moves the movable member 3 in the direction of either the arrow A or the arrow B shown in FIG. 6. Here, upon comparison, if the amount of displacement of the movable member 3 that has moved by the driving signal from the CPU 11e differs from the actual amount of displacement of the movable member 3 that is calculated, the CPU 11e further outputs the driving signal for correcting the amount of displacement of the movable member 3 based on the actual amount of displacement of the movable member that is calculated and the amount of displacement of the movable member 3 is corrected.

As it has been mentioned above, since the target to be detected by the position detector 5 is let to be the reflector 12 that is provided on the protruding portion 4*d* and not the blade spring 4, as in a case of the blade spring 4, there is no change in the reflectivity of light from the surface due to deterioration with aging, and the position detector 5 can receive light with stability over a long period of time. This enables to secure the accuracy of positioning of the movable member 3 over a long period by using a low cost position detector with a narrow range of detection similar to that according to the first embodiment. Moreover, the reflector 12 provided on the protruding portion 4*d* is displaced without being bent much comparatively, in synchronization with the displacement of the end portion 4*c* of the hollow portion 4*b*. Therefore, as compared to a case in which the blade spring 4 that is displaced with the movement of the movable member 3 is let to be the target of detection, the amount of displacement of the blade spring in the protruding portion 4*d* becomes less. In other words, the position of providing the reflector 12 can be let to be a voluntary position of the protruding portion 4*d*, thereby enabling to improve the degree of freedom of designing. Further, as the protruding portion 4*d* is displaced without being bent much comparatively, an angle of reflection by the reflector 12 for the light that is phototransmitted from the position detector, can be stabilized. This enables the position detector to receive the light stably and to secure further the accuracy of positioning of the movable member.

Figure 10:
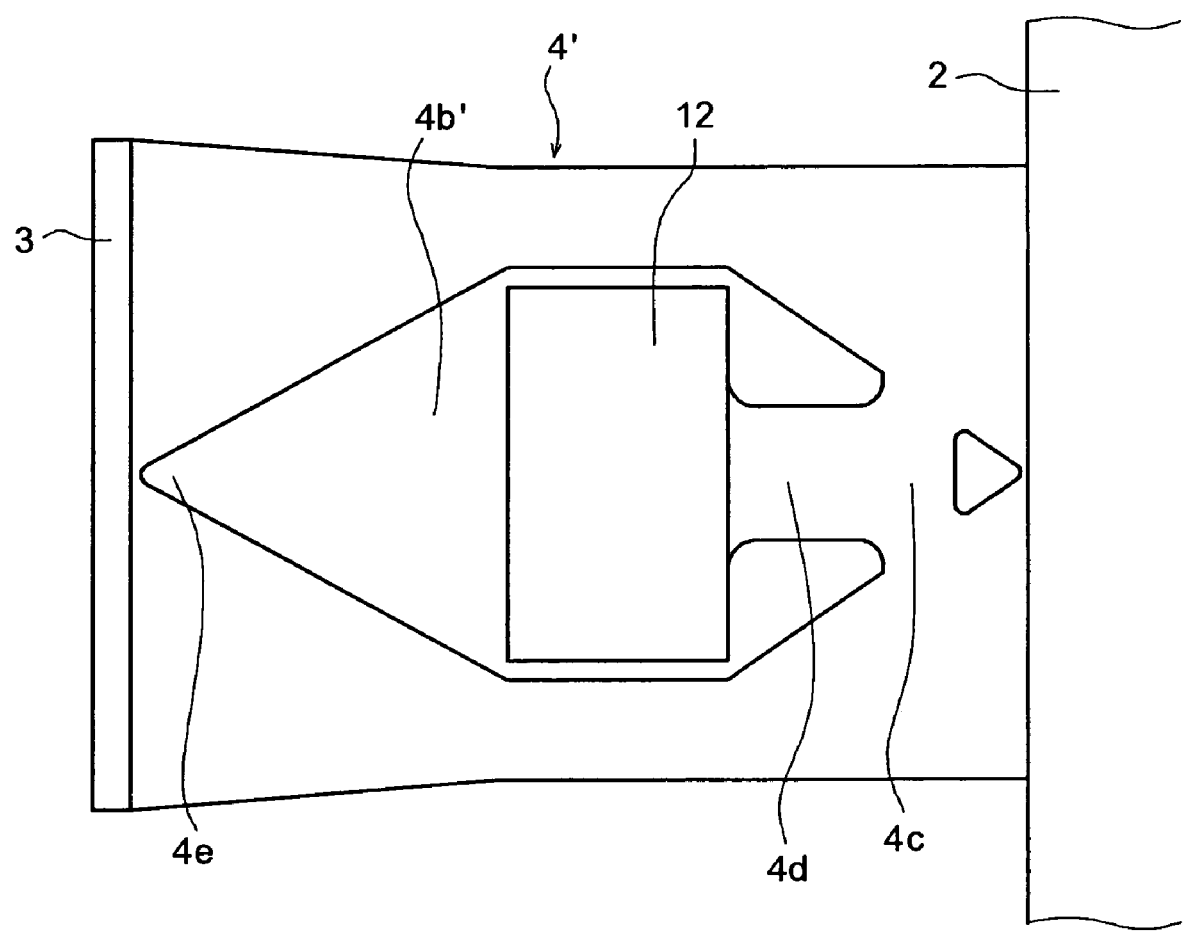
FIG. 10 is another example of a structure of the blade spring of the actuator according to the second embodiment.

FIG. 10 is another example of a structure of the blade spring of the actuator according to the second embodiment. As shown in FIG. 10, regarding a shape of a hollow portion 4*b*' of the blade spring 4', the central portion is wide, and is narrow in shape towards both ends of the hollow portion 4*b*' from the central portion, i.e. towards the end portion 4*c* on the side of the fixed member 2 and an end portion 4*e* on the side of the movable member 3. In other words, the shape of the hollow portion 4*b*' is roughly rhombus. This enables to decentralize local stress that is exerted on the blade spring 4', to prevent local fatigue, and to increase life of the blade spring 4'. Moreover, because the central portion of the hollow portion 4*b*' is wide, the reflector 12 can be provided in a voluntary position in the central portion 4*b*'. Further, when the object detecting apparatus changes a direction of laser light or a direction of irradiation of electric waves in upward and downward directions or to left and right directions, by providing the reflector 12 in the central portion of the hollow portion 4*b*', the shape of the blade spring 4' in a cross direction can be let to be a long shape and the position detector 5 can receive the light sufficiently from the reflector 12 even if the blade spring 4' for moving the movable member 3 to the left and the right directions (upward and downward directions) has moved in upward and downward direction (to left and right direction).

Further, according to the second embodiment, the reflector 12 is provided on a front end of the protruding portion 4*d* of the blade spring 4, however, the present invention is not restricted to this, and it can also be provided on one side of end portion 4*c* of the hollow portion 4*b* rather than the end of the protruding portion 4*d*, i.e. on the side of the fixed member 2 of the blade spring 4'. In this case, while integrating the reflector 12 into the other component (such as the fixed member 2 and the movable member 3) of the actuator 1', the protruding portion can be clamped between the end portion 4*c* and the front end of the protruding portion 4*d*. Therefore, the reflector 12 can be fixed assuredly in the protruding portion 4*d*.

Figure 11A:
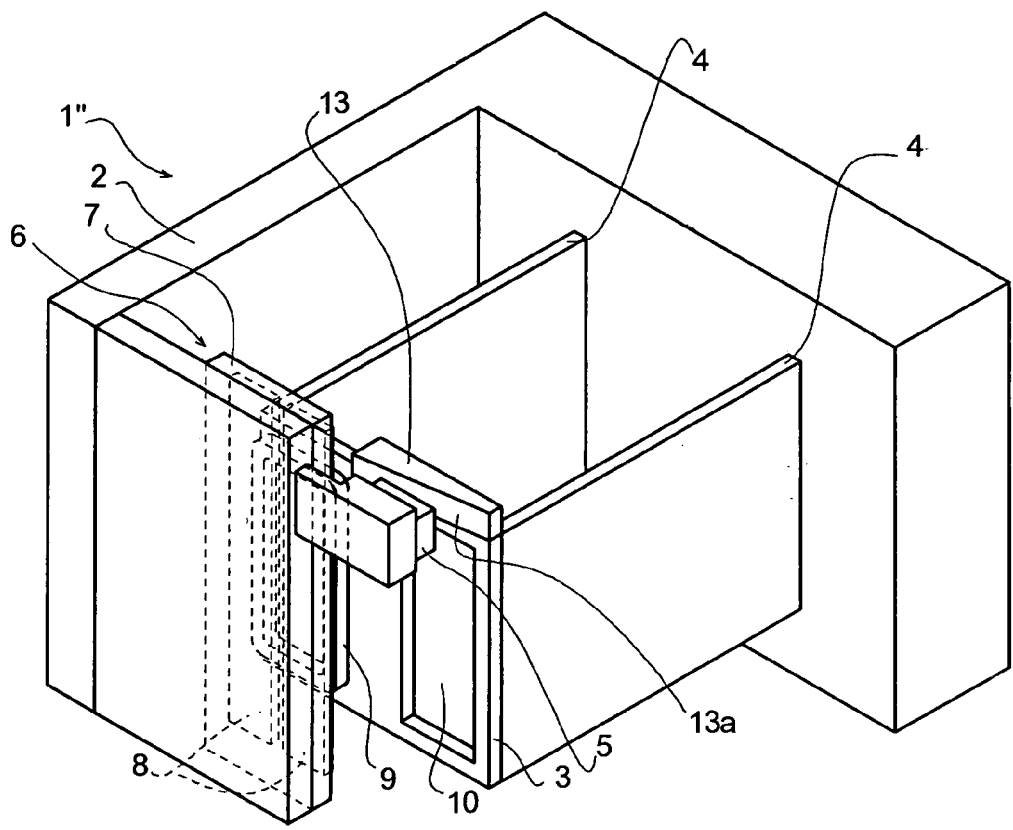
FIG. 11A is a perspective view and FIG. 11B is a top view of an actuator according to a third embodiment of the present invention.
Figure 11B:
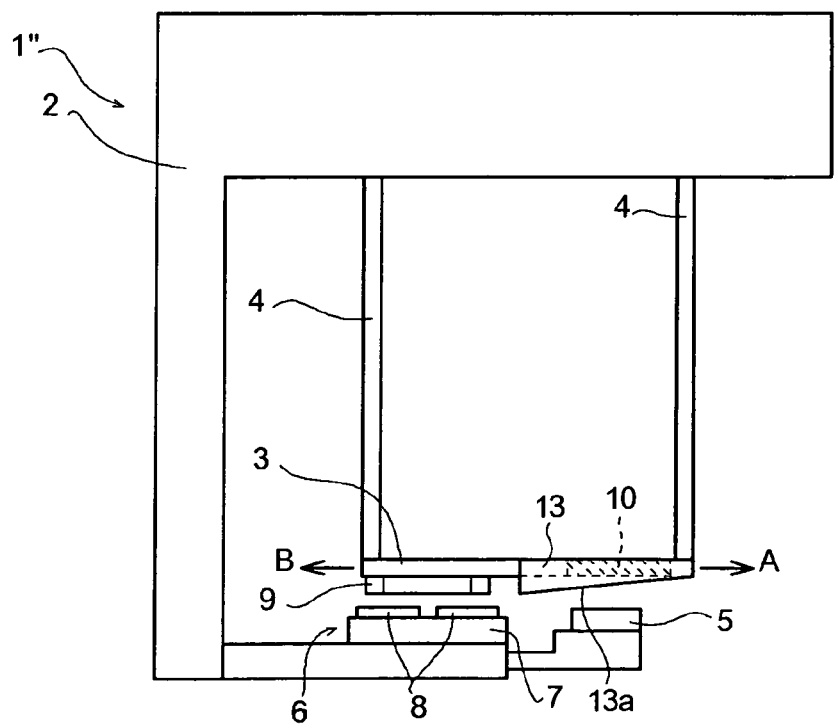

FIG. 11A is a perspective view and FIG. 11B is a top view of an actuator according to a third embodiment of the present invention. An actuator 1" shown in these diagrams differs from the actuator 1 shown in FIG. 1 at a point that the position detector 5 is attached to the fixed member 2 that faces the movable member 3. Further, another point of difference is that a displacing member 13 that moves together with the movable member 3 and is displaced in a direction at right angles to a direction of movement of the movable member 3, is provided on the movable member 3 that faces the position detector 5. Further, since a basic structure of the actuator 1" according to the third embodiment is similar to that of the actuator 1 according to the first embodiment, a description of the basic structure is omitted.

As shown in FIG. 11A, the position detector 5 is provided at an end portion where the driving unit 6 of the fixed member 2 is mounted. On the other hand, the movable member 3 is provided with the displacing member 13 at a position facing the position detector 5 (on an upper surface of the movable member in FIG. 11A). The displacing member 13 is in the form of a triangular pole and is provided with an inclined surface 13*a* that has an angle of inclination for which a distance with the position detector 5 in a direction at right angles to the direction of movement of the movable member 3 is displaced with the movement of the movable member 3. This displacing member 13, particularly the inclined surface 13*a*, is made of a resin material for which there is no change in the reflectivity of light from the surface due to deterioration with aging like in a case of the blade spring. Here, the position detector 5 is installed within the range of detection of the position detector 5 (range of sensitivity of the sensor in the photosensor) with respect to the displacing member 13 and in a position where a distance between the inclined surface 13*a* of the displacing member 13 and the position detector 5 can be detected. Moreover, it is favorable that an angle of inclination of the inclined surface 13*a* with respect to the direction of movement of the movable member 3 is an acute angle, i.e. the angle of inclination is such that with the movement of the movable member 3, an amount of displacement of the displacing member that is displaced in the direction at right angles to the direction of movement, is in the range of detection of the position detector 5. Further, by letting the displacing member to be made of the resin material, it can be integrated with the other components (such as the fixed member 2 and the movable member 3) of the actuator 1'.

Figure 12A:
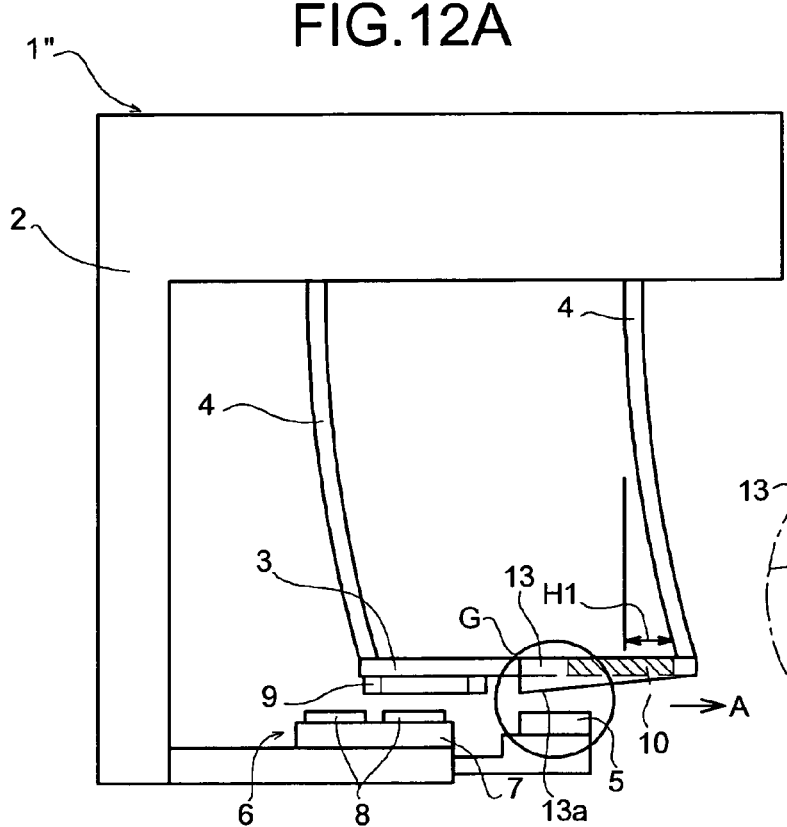
FIG. 12A depicts the actuator that has moved in a direction of an arrow A shown in FIG. 11B.
Figure 12B:
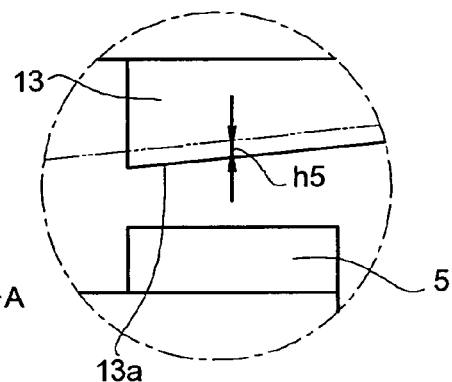
FIG. 12B is an enlarged view of a portion G in FIG. 12A.
Figure 12C:
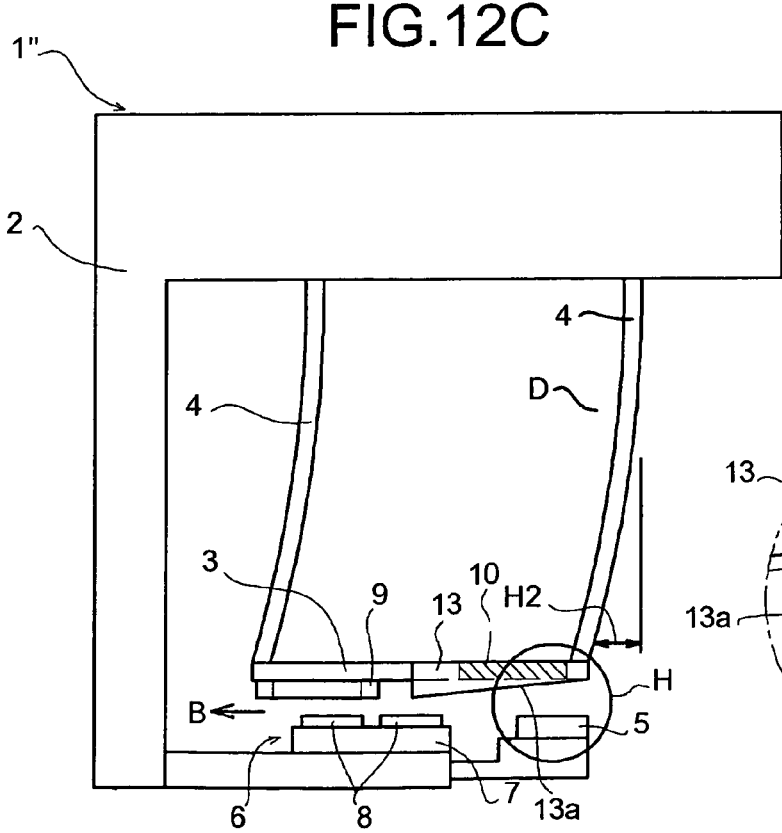
FIG. 12C depicts the actuator that has moved in a direction of an arrow B shown in FIG. 11B.
Figure 12D:
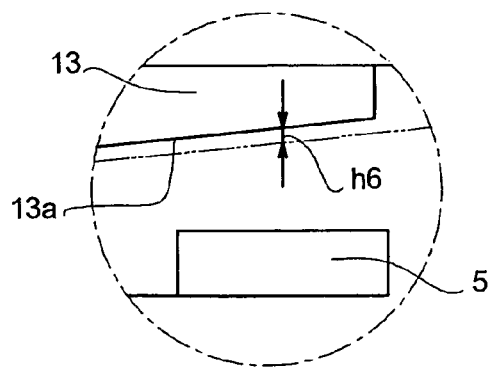
FIG. 12D is an enlarged view of a portion H in FIG. 12C.

Next, an operation of the actuator 1" is described. FIG. 12 is a diagram for explaining the operation of the actuator according to the third embodiment, FIG. 12A is a diagram for explaining a state of the actuator that has moved in the direction of the arrow A shown in FIG. 11B, FIG. 12B is an enlarged view of a portion G in FIG. 12A, FIG. 12C is a diagram for explaining a state of the actuator that has moved in the direction of the arrow B shown in FIG. 11B, and FIG. 12D is an enlarged view of a portion H. When the driving current is supplied from the calculating unit 11 that is mentioned later, to the driving unit 6 through the blade springs 4, the driving force in the direction of the arrow A is generated as shown in FIG. 12A. When the driving force is generated in the direction of the arrow A, the blade springs 4 are bent and the movable member 3 moves in the direction of the arrow A up to the position where the driving force and the elastic force of the blade springs 4 are balanced, and stops at this position. At this time, the inclined surface 13*a* of the displacing member 13 being inclined at an angle with respect to the direction of the arrow A of the movable member, an amount of displacement of the displacing member 13 that is provided on the movable member 3 becomes h5, which is smaller than the amount of displacement H1 of the movable member 3, as shown in FIG. 12B. On the other hand, by supplying the driving current in the reverse direction to the driving unit 6, when the driving force is generated in the direction of the arrow B as shown in FIG. 12C, the blade springs 4 are bent, the movable member 3 moves in the direction of the arrow B up to the position where the driving force and the elastic force of the blade springs 4 are balanced, and stops at this position. At this time, the inclined surface 13a of the displacing member 13 being inclined at an angle with respect to the direction of the arrow B of the movable member 3, the amount of displacement of the displacing member 13 that is provided on the movable member 3 becomes h6, which is smaller than the amount of displacement of the movable member 3, as shown in FIG. 12D. In other words, the position detector 5 detects the distance between the displacing member 13 and the position detector 5 based on the amounts of displacement h5 and h6 of the displacing member 13, which are smaller than the amounts of displacements H1 and H2 of the movable member 3.

Figure 13:
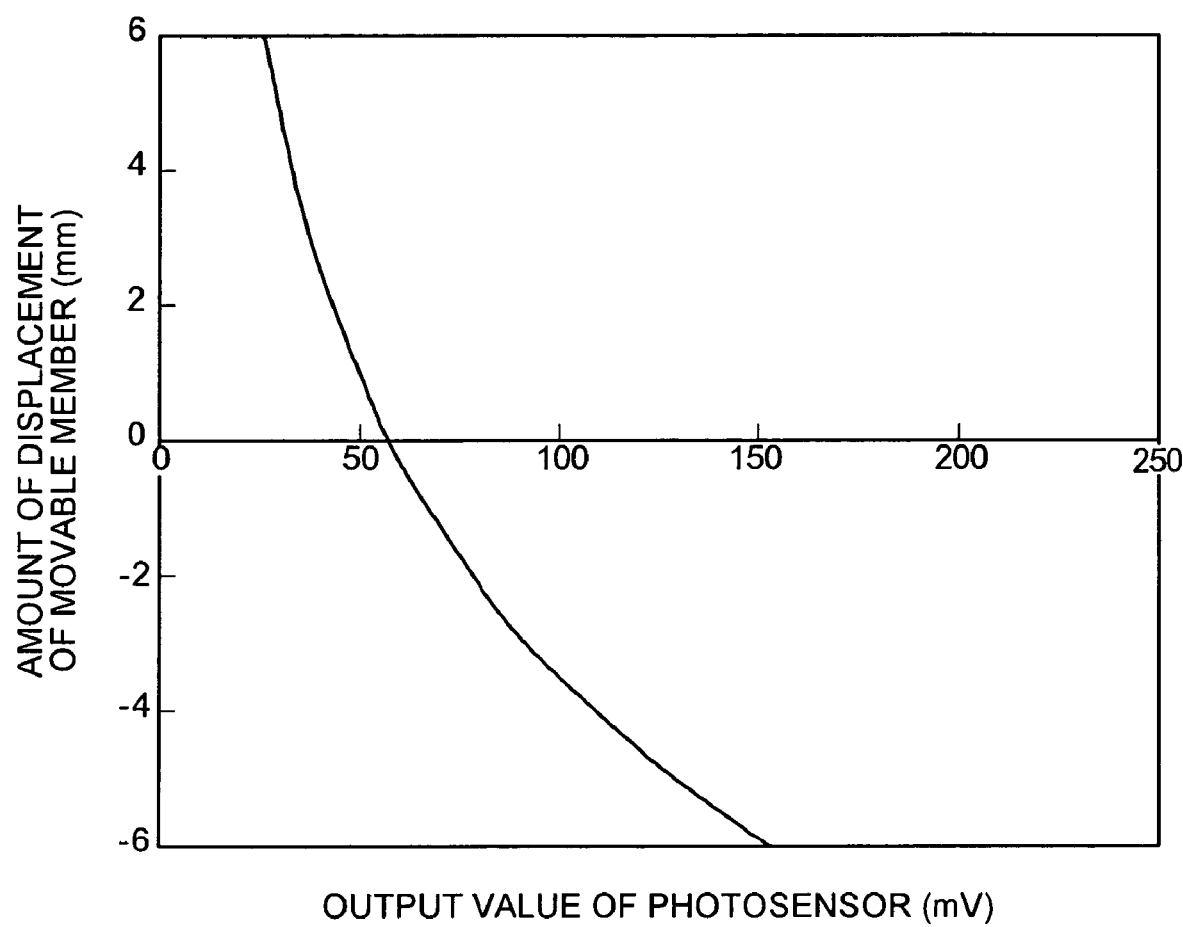
FIG. 13 is a diagram for explaining a relationship between the output value of the photosensor and an amount of displacement of the movable member of the actuator according to the third embodiment.

FIG. 13 is a diagram for explaining the relationship between the output value of the photosensor and the amount of displacement of the amount of displacement of the movable member of the actuator according to the third embodiment. This is a case where the photosensor that has the amount of displacement ±6 mm of the movable member 3 and the range of detection (sensitivity of the sensor) ±1.5 mm, is used as the position detector 5. As shown in FIG. 13, it can be verified that the output value (mV) upon detection of the amount of displacement of the displacing member 13 by the position detector corresponding to the amount of displacement ±6 mm of the movable member 3, secures linearity. In other words, the amount of displacement of the movable member 3 with the large amount of movement can be dealt with within the range of resolution of the position detector 5 that has a narrow range of detection.

The calculating unit of the actuator 1" according to the third embodiment has an identical configuration as that of the calculating unit 11 of the actuator 1 according to the first embodiment shown in FIG. 5. To start with, the light that is transmitted from the phototransmitting element 5a of the position detector 5 is reflected from the displacing member 13 that faces the position detector 5, and light reflected from the displacing member 13 is received by the photoreceiving element 5b. The photoreceiving element 5b outputs current that has a voltage value according to the intensity of the light reflected, as the output value of the photosensor (refer to FIG. 13), and this output value of the photosensor is input to the comparison judging unit 11c through the amplifier 11a and the A/D converter 11b. The comparison judging unit 11c compares the digital output value that is input and the digital output value in the table of the database 11d shown in FIG. 5B and outputs the actual amount of displacement of the movable member 3 to the CPU 11e. The CPU 11e outputs the amount of displacement of the movable member 3 as a driving signal to the driving circuit 11f to move the movable member 3, the driving circuit 11f supplies the driving current to the driving unit 6, and moves the movable member 3 in the direction of either the arrow A or the arrow B. Here, upon comparison, if the amount of displacement of the movable member 3 that has moved by the driving signal from the CPU 11e differs from the actual amount of displacement of the movable member 3 that is calculated, the CPU 11e further outputs the driving signal for correcting the amount of displacement of the movable member 3 based on the actual amount displacement of the movable member that is calculated and the amount of displacement of the movable member 3 is corrected. As it has been mentioned above, since the target to be detected by the position detector 5 is let to the displacing member 13 that is provided on the movable member 3 and the amounts of displacement h5 and h6 of the movable member 3 that is displaced according to the movement of the movable member 3 are displaced in a range smaller than the amount of displacements H1 and H2 of the movable member 3, it is possible to use a position detector that is low cost and with a narrow range of detection (for example, a low cost photosensor) similar to that according to the first embodiment. Therefore, even if the amount of movement of the movable member 3 is large, the position detector 5 can detect the distance between the displacing member 13 and the position detector 5, and from this distance it is possible to calculate the amount of displacement of the movable member 3, thereby enabling to secure the accuracy of positioning of the movable member.

According to the third embodiment, the inclined surface 13a of the displacing member 13 is provided in the longitudinal direction of the actuator 1", in other words the inclined surface 13a of the displacing member 13 is provided on a surface that faces the fixed member 2 on which the yoke 7 and the magnet 8 of the driving unit 6 of the displacing member 13 are provided. However, it is not restricted to this position and may also be provided on an upper surface of the displacing member 13. In this case, the position detector 5 is provided on the fixed member 2 in a position facing the upper surface of the displacing member 13. Moreover, the displacing member 13 may also be provided on a bottom surface of the movable member 3. Further, the displacing member 13 need not be restricted to be in the form of the triangular pole and any shape for which the distance of the displacing member from the position detector in the direction at right angles to the direction of movement of the movable member 3 with the movement of the movable member 3, such as a shape that has a cross section in the form of a semicircular arc or an elliptical arc. Particularly, it is favorable that the shape is such that the distance between the position detector 5 and the displacing member 13 is displaced largely with an increase in the amount of movement of the movable member 3. This enables to improve the linearity of the detection result of the position detector 5.

According to the second and the third embodiments, the photosensor is used as the position detector 5, the reflector 12, and the displacing member 13, however, the present invention is not restricted to this and a magnetic body that generates magnetism may be used instead of the reflector 12 and the displacing member 13 and a magnetic sensor may be used as the position detector 5.

Moreover, for the actuators 1, 1', and 1" according to the first to third embodiments, the position detector 5 is provided on the fixed member 2, however, the present invention is not restricted to this and can be provided on an actuator-fixing member that is not shown in the diagram and is provided separately for fixing the actuators 1, 1', and 1" or on a control circuit board on which the calculating unit is provided. By doing so, there is no protrusion in the cross direction of the actuators 1, 1', and 1" and the size of the actuator can be reduced.

Figure 14:
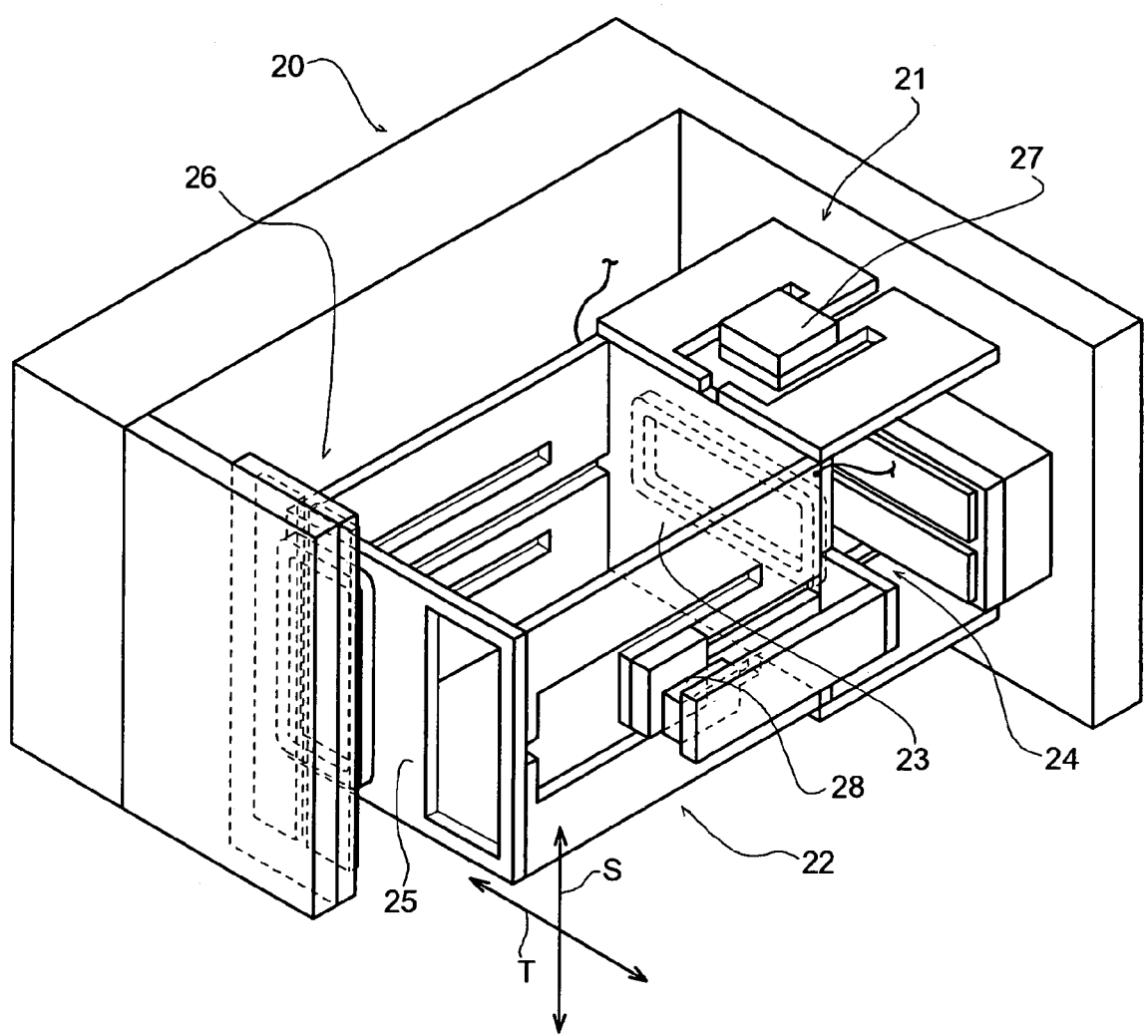
FIG. 14 is a diagram for explaining an example of a structure of an actuator when the movable member has moved in an upward and a downward directions, and to left and right directions.

Further, for the actuators according to the first to the third embodiments, a case in which the movable member 3 is moved in the direction of either the arrow A or the arrow B, i.e. a case in which the movable member 3 is moved in the left or right direction has been described. However, the present invention is not restricted to this case only and the movable member may be moved in the upward and the downward directions or in the upward and downward direction as well as to the left and the right directions. FIG. 14 is a diagram for explaining an example of a structure of an actuator when the movable member is moved in the upward and downward directions and to the left and the right directions. As shown in FIG. 14, an actuator 20 includes an actuator 21 for upward and downward movement and an actuator 22 for movement in left and right directions. Any one of actuators 1, 1', and 1" according to the first to the third embodiments may be used as the actuator 21 for the upward and downward movement and the actuator 22 for movement to the left and right directions. A movable member of the actuator 21 for the upward and downward movement and a fixed member of the actuator 22 for movement in left and right direction include a holder 23.

This actuator 20 can move the holder 23 in either the upward or the downward directions by supplying the driving current from a controller that is not shown in the diagram to a driving unit 24 of the actuator 21 for the upward and downward movement. In other words, the actuator 21 for the upward and downward movement can move a movable member 25 of the actuator 22 for movement to the left and the right directions in either the upward or the downward direction (in a direction of an arrow S in FIG. 14). On the other hand, the actuator 20 can move the movable member 25 in either the right or the left direction by supplying the driving current from a controller that is not shown in the diagram to a driving unit 26 of the actuator 22 for movement to the left and the right directions (in a direction of an arrow T in FIG. 14). A basic structure of a calculating unit of this actuator 20 is roughly similar to that of the calculating unit 11 shown in FIG. 4 and based on the amount of displacement of the movable member 25 of the actuator 22 for movement in the left and the right directions and the holder 23 that is calculated from the output value of the photosensor (output value of the magnetic sensor when the position detector is a magnetic sensor) that is output from a position detector 27 for the actuator 21 for the upward and the downward movement and a position detector 28 for the actuator 22 for movement in the left and the right direction, a driving signal for correcting the amount of displacement of the movable member 25 and the holder 23 is output, and the amount of displacement of the movable member 3 is corrected.

In a case of moving the movable member 3 in the upward and the downward directions or in upward and downward as well as to the left and the right directions by using the actuator 1" according to the third embodiment, a wire spring may be used instead of the blade spring 4. Since this wire spring can bend in any one of the upward, downward, left, and right directions, the movable member 25 may be supported by the fixed member of the actuator 20 with a plurality of wire springs and there is no need to arrange two actuators 1" according to the third embodiment, thereby shortening the length in the longitudinal direction of the actuator 20.

Figure 15:
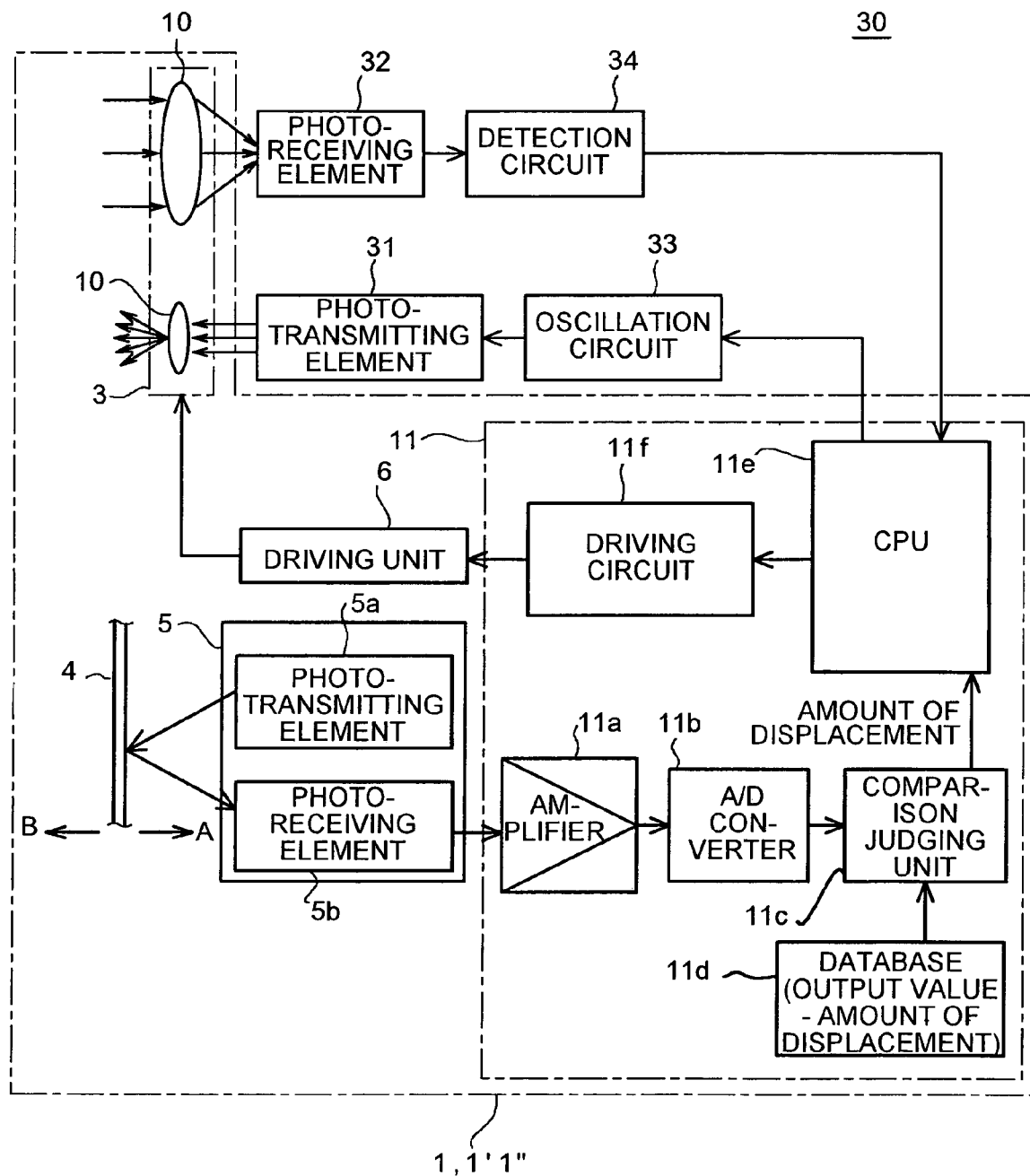
FIG. 15 is a schematic block diagram of an object detecting apparatus.

Next, an object detecting apparatus, in which the actuator according to the first to the third embodiments is used, is described. FIG. 15 is a schematic block diagram of an object detecting apparatus. An object detecting apparatus 30 is installed in a predetermined position on a mobile body that is not shown in the diagram, such as on a front side, on a side, or on a rear side of the mobile body. Moreover, this object detecting apparatus 30 includes at least any one of the actuators 1, 1', and 1", a phototransmitting element 31 that is a phototransmitting unit, and a photoreceiving element 32 that is a photoreceiving unit. Further, 33 is an oscillation circuit for oscillating the phototransmitting element 31, and 34 is a detection circuit that processes a current value of an intensity of reflected light from the photoreceiving element 32.

In the object detecting apparatus 30, for acquiring information from outside of the mobile body, an oscillation signal is output from the CPU 11e to the oscillation circuit 33, the oscillation circuit 33 outputs a phototransmission signal to the phototransmitting element 31, the phototransmitting element 31 irradiates laser beam on an outside of the mobile body via a lens 10 for phototransmitted and photoreceived light which is an optical element of the movable member. At this time, as the object detecting apparatus 30 searches a wide range of the outside of the mobile body, based on a search-pattern that is stored in a storage that is not shown in the diagram, the CPU 11e outputs the driving signal to the driving circuit 11f. The driving circuit 11f supplies the current to the driving unit 6 and moves the movable member 3, i.e. moves the lens 10 for phototransmitted and photoreceived light. In other words, the object detecting apparatus 30 changes a direction of irradiation of the laser beam that is irradiated on the phototransmitting element 31 by moving the lens 10 for phototransmitted and photoreceived light, based on the search-pattern that is stored in the storage.

When there is no object existing outside the mobile body, the direction of irradiation of the laser beam may be changed based on the search-pattern for example. When there is an object existing outside the mobile body, the laser beam is reflected from this object and the reflected light is received by the photoreceiving element 32 via the lens 10 for phototransmitted and photoreceived light. The photoreceiving element 32 outputs the current value of the intensity of the reflected light that is received, to the detection circuit 34, the detection circuit 34 processes this current value and outputs to the CPU 11e. The CPU 11e outputs the existence of an object outside the mobile body to outside by an alarm unit or a display unit that is not shown in the diagram.

According to the object detecting apparatus 30, to detect an object or to detect a distance up to the object, the CPU 11e moves the lens 10 for phototransmitted and photoreceived light of the movable member 3 by outputting the driving signal to the driving circuit 11f. At this time, the mobile body receives various external influences. The examples are vibrations created by movement of the mobile body and an inclination caused by receiving of wind by the mobile body. If such an external influence is input, the lens 10 for phototransmitted and photoreceived light sometimes do not move as expected by the CPU 11e. However, since the CPU 11e has been acquiring the amount of displacement of the movable member 3 on a periodic basis from the position detector 5, it continuously corrects the driving signal that is output to the driving circuit 11f to move the lens 10 for phototransmitted and photoreceived light as expected.

Further, although the object detecting apparatus 30 is a detector, in which the laser beam is used, the present invention is not restricted to this and a detector in which electric waves are used may be used. In this case, instead of the lens 10, an antenna that transmits and receives electric waves (millimeter waves) is provided to any one of the actuators 1, 1', and 1" that is used in the object detecting apparatus 30, the oscillation circuit 33 and the phototransmitting element 31, which is a phototransmitting unit shown in FIG. 15, are changed to a transmitting circuit that is a transmitting unit, and the detection circuit 34 and the photoreceiving element 32, which is a photoreceiving unit, are changed to a receiving circuit that is a receiving unit.

Thus, the object detecting apparatus 30 uses the actuators 1, 1', and 1" to move the lens 10 for phototransmitted or photoreceived light, it is possible to secure an accuracy of the direction of irradiation of the electric waves that are transmitted from the transmitting unit or the laser beam that is phototransmitted from the phototransmitting element 31, which is the phototransmitting unit and to secure an accuracy of detection of an object outside the mobile body and an accuracy of detection of a distance between the mobile body and the object.

Further, in a case of changing the direction of irradiation of the electric waves or the laser beam to any one of the upward, downward, left, and right directions, as shown in FIG. 14, in the structure a lens or an antenna may be provided on the movable member 25 of the actuators 22 on both the sides of the actuator 20. Moreover, the object detecting apparatus 30 is provided with the lens 10 for phototransmitted and photoreceived light on the movable member 3, the structure may be such that at least a lens for phototransmitted light or an antenna for transmission is provided to the movable member 3 and the direction of irradiation of the electric waves or the laser beam can be changed.

As explained above, according to the present invention, a predetermined position of a flat surface portion of a blade spring that is displaced with a movement of a movable member is let to be a target of detection, the flat surface portion of the blade spring bends with the movement of the movable member. Therefore, since the flat surface portion of the blade spring moves due to bending, the flat surface portion of the blade spring is displaced with respect to a position detector. Since this amount of displacement of the blade spring, is displaced in a range smaller than that of an amount of displacement of the movable member, it is possible to use a position detector that is low cost and has a narrow range of detection, and to calculate the amount of displacement of the movable member from a distance between the predetermined position of the flat surface portion of the blade spring and the position detector even if the amount of movement of the movable member is large, thereby enabling to secure an accuracy of positioning of the movable member.

According to the next invention, a protruding portion is displaced without being bent much comparatively, with displacement of a hollow portion towards a side of a fixed member while being supported by a side of the fixed member of the hollow portion. Therefore, as compared to a case of letting the blade spring that is displaced with the movement of the movable member, the amount of displacement of the blade spring of the protruding portion is less and a voluntary position of the protruding portion of the blade spring can be let to be the target of detection of the position detector, thereby enabling to improve the degree of freedom of designing. Further, since the protruding portion is displaced without being bent much comparatively, it is possible to stabilize an angle of reflection of light that is phototransmitted from the position detector. By doing so, the position detector can receive light stably and the accuracy of positioning of the movable member can be secured.

According to the next invention, the local stress that is exerted on the blade spring when the movable member has moved can be decentralized and local fatigue can be prevented, thereby enabling to increase life of the blade spring.

According to the next invention, since a reflector, and not the blade spring, is let to be a target of detection of the position detector, the position detector can receive light stably over a long period of time without change in reflectivity of light from a surface due to deterioration with aging as in the case of the blade spring. This enables to secure the accuracy of positioning of the movable member over a long period of time.

According to the next invention, since a photosensor or a magnetic sensor that is easily available at a low cost and has a small size is used as the position detector, an actuator that secures the accuracy of positioning of the movable member can be constructed easily and provided at a low cost.

According to the next invention, a displacing member that is provided on the movable member is let to be the target of detection and this displacing member is displaced in a direction at right angles to a direction of movement of the movable member with the movement of the movable member. Since an amount of displacement of the displacing member is displaced in a range smaller than that of the amount of displacement of the movable member, it is possible to use a position detector that is low cost and has a narrow range of detection, and to calculate the amount of displacement of the movable member from a distance between the displacing member and the position detector even if the amount of movement of the movable member is large, thereby enabling to secure an accuracy of detection of the movable member.

According to the next invention, a displacing member in the form of a triangular pole has an inclined surface that is inclined at an angle with respect to a direction of movement of the movable member and this inclined surface is the target of detection by the position detector. A distance between this inclined surface and the position detector increases in the direction at right angles to the direction of movement of the movable member when the movable member is moved in one direction by a driving unit and decreases in the direction at right angles to the direction of movement of the movable member when the movable member is moved in the other direction by the driving unit. Since an amount of displacement of this displacing member in the form of a triangular pole is displaced in a range smaller than that of the amount of displacement of the movable member, it is possible to use a position detector that is low cost and has a narrow range of detection, and to calculate the amount of displacement of the movable member from a distance between the displacing member and the position detector even if the amount of movement of the movable member is large, thereby enabling to secure an accuracy of detection of the movable member. Moreover, since the photosensor or the magnetic sensor that is easily available at a low cost and has a small size is used as the position detector, an actuator that secures the accuracy of position of the movable member can be constructed easily and provided at a low cost.

According to the next invention, since the actuator mentioned above is used as the actuator, it is possible to use a position detector that is low cost and has a narrow range of detection and to calculate the amount of displacement of the movable member from a distance between this displacing member and the position detector even if an amount of movement of the movable member that is provided with an optical element or an antenna is large, thereby enabling to secure the accuracy of detection of the movable member. Therefore, it is possible to secure an accuracy of positioning of an antenna that irradiates electric waves or an optical element that changes a direction of irradiation of laser light, installed on the movable member. This enables to secure an accuracy of direction of irradiation of electric waves that are transmitted from a transmitting unit or laser beam that is phototransmitted from a phototransmitting unit and to secure an accuracy of detection of a presence or an absence of an object outside a mobile body and of a distance between the mobile body and the object.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An actuator comprising:
a pair of blade springs;
a driving unit;
a position detector; and
a calculating unit;
one end of each blade spring being attached to a fixed member, and the other end of each blade spring being attached to a movable member; the blade spring being attached in parallel to each other with respect to the movable member and the fixed member; the movable member or one of the blade springs having a predetermined position of flat surface; the driving unit moving the movable member; the position detector having a phototransmitting element and a photoreceiving element; the position detector being attached to the fixed member so that the phototransmitting element and the photoreceiving element face the predetermined position of flat surface; the calculating unit calculating an amount of displacement of the movable member;
wherein the position detector detects a distance between the predetermined position of flat surface and the position detector by irradiating a light on the flat surface from the phototransmitting element so that the reflected light is received by the photoreceiving element, and the calculating unit calculates the amount of displacement of the movable member based on the distance detected by the position detector.

2. An actuator comprising:
a blade spring;
a driving unit;
a position detector; and
a calculating unit;
one end of the blade spring being attached to a fixed member, and the other end of the blade spring being attached to a movable member; the blade spring having a hollow space and a protruding portion which protrudes from the fixed member toward the movable member; the protruding portion having a predetermined position of flat surface; the driving unit moving the movable member; the calculating unit calculating an amount of displacement of the movable member;
wherein the position detector detects a distance between the predetermined position of flat surface on the protruding portion of the blade spring and the position detector, and the calculating unit calculates the amount of displacement of the movable member based on the distance detected by the position detector.

3. The actuator according to claim 2, wherein the hollow portion of the blade spring is widest at substantially a center and becomes narrower towards ends of the hollow portion.

4. The actuator according to claim 2, wherein a reflector is provided on the protruding portion, and the position detector detects a distance to the reflector.

5. The actuator according to claim 2, wherein a magnetic body is attached to the protruding portion of the blade spring, and the position detector is a magnetic sensor that detects the distance by detecting a magnetism field produced by the magnetic body.

6. An object detecting apparatus mounted on a first object, comprising:
a laser oscillator that produces laser beams;
an actuator that deflects the laser beams;
a photoreceiving unit that receives laser beams that after being deflected by the actuator fall on a second object, which moves relatively to the first object, and are reflected from the second object; and
a detecting/calculating unit that any one of detects a presence of the second object and calculates a distance between the first object and the second object based on laser beams received in the photoreceiving unit;
wherein the actuator includes;
a pair of blade springs; one end of each blade spring is attached to a fixed member, and the other end of each blade spring is attached to a movable member; the blade springs are attached in parallel to each other with respect to the movable member and fixed member; one of the blade springs has a predetermined position of flat surface;
a driving unit that moves the movable member;
an optical element that is attached to the movable member and that receives the laser beams from the laser oscillator and deflects the laser beams to at least two directions that are orthogonal to each other;
a position detector that has a phototransmitting element and a photoreceiving element; the position detector is attached to the fixed member so that the phototransmitting element and the photoreceiving element face the predetermined position of flat surface on the blade spring; the position detector detects a distance to a predetermined position of a flat surface portion of the blade spring; and
a calculating unit that calculates an amount of displacement of the movable member based on the distance detected by the position detector.

7. An object detecting apparatus mounted on a first object, comprising;
a wave producer that produces waves;
an actuator that deflects the waves;
a receiver that receives waves that after being deflected by the actuator fall on a second object, which moves relatively to the first object, and are reflected from the second object; and
a detecting/calculating unit that any one of detects presence of the second object and calculates a distance between the first object and the second object based on waves received in the receiver,
wherein the actuator includes a blade spring of which one end is supported by a fixed member and other end is supported by a movable member;
a driving unit that moves the movable member;
an antenna that is attached to the movable member and that produces the waves;
a position detector that detects a distance to a predetermined position of a flat surface portion of the blade spring; and
a calculating unit that calculates an amount of displacement of the movable member based on the distance detected by the position detector.

* * * * *